United States Patent
Saito

(10) Patent No.: US 11,032,483 B2
(45) Date of Patent: Jun. 8, 2021

(54) IMAGING APPARATUS, IMAGING METHOD, AND PROGRAM

(71) Applicant: FUJIFILM Corporation, Tokyo (JP)

(72) Inventor: Taro Saito, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/805,845

(22) Filed: Mar. 2, 2020

(65) Prior Publication Data
US 2020/0204722 A1    Jun. 25, 2020

Related U.S. Application Data

(63) Continuation of application No. PCT/JP2018/024136, filed on Jun. 26, 2018.

(30) Foreign Application Priority Data

Sep. 29, 2017 (JP) .............................. JP2017-190536

(51) Int. Cl.
*H04N 5/235*  (2006.01)
*G06T 5/00*   (2006.01)
*G06T 5/50*   (2006.01)

(52) U.S. Cl.
CPC ........... *H04N 5/2355* (2013.01); *G06T 5/009* (2013.01); *G06T 5/50* (2013.01); *H04N 5/2353* (2013.01)

(58) Field of Classification Search
None
See application file for complete search history.

(56) References Cited

U.S. PATENT DOCUMENTS

| 2008/0117316 A1* | 5/2008 | Orimoto | H04N 13/246 348/240.3 |
| 2010/0097493 A1* | 4/2010 | Asoma | H04N 5/235 348/229.1 |
| 2012/0287309 A1* | 11/2012 | Awatani | H04N 5/2355 348/239 |

(Continued)

FOREIGN PATENT DOCUMENTS

| JP | 2003264738 | 9/2003 |
| JP | 2010239277 | 10/2010 |

(Continued)

OTHER PUBLICATIONS

"International Search Report (Form PCT/ISA/210) of PCT/JP2018/024136," dated Sep. 11, 2018, with English translation thereof, pp. 1-4.

(Continued)

*Primary Examiner* — James M Hannett
(74) *Attorney, Agent, or Firm* — JCIPRNET

(57) ABSTRACT

An imaging apparatus includes an imager, and a processor configured to perform a dynamic range expansion process by generating one composite image from a plurality of captured images, perform the dynamic range expansion process by correcting an output value of a signal of one captured image, and execute the process by the dynamic range expansion process by generating one composite image from the plurality of captured images or the dynamic range expansion process by correcting the output value of the signal of the one captured image based on a time of one frame period and a total exposure time in a case of capturing the plurality of captured images.

20 Claims, 18 Drawing Sheets

(56) References Cited

U.S. PATENT DOCUMENTS

| 2013/0329090 A1* | 12/2013 | Ise | H04N 5/2621 |
| | | | 348/240.99 |
| 2014/0253792 A1* | 9/2014 | Watanabe | H04N 5/35581 |
| | | | 348/362 |
| 2017/0187968 A1* | 6/2017 | Kobayashi | H04N 5/3745 |

FOREIGN PATENT DOCUMENTS

| JP | 2012119761 | 6/2012 |
| JP | 2014146850 | 8/2014 |
| JP | 2015033020 | 2/2015 |

OTHER PUBLICATIONS

"Written Opinion of the International Searching Authority (Form PCT/ISA/237) of PCT/JP2018/024136," dated Sep. 11, 2018, with English translation thereof, pp. 1-7.

* cited by examiner

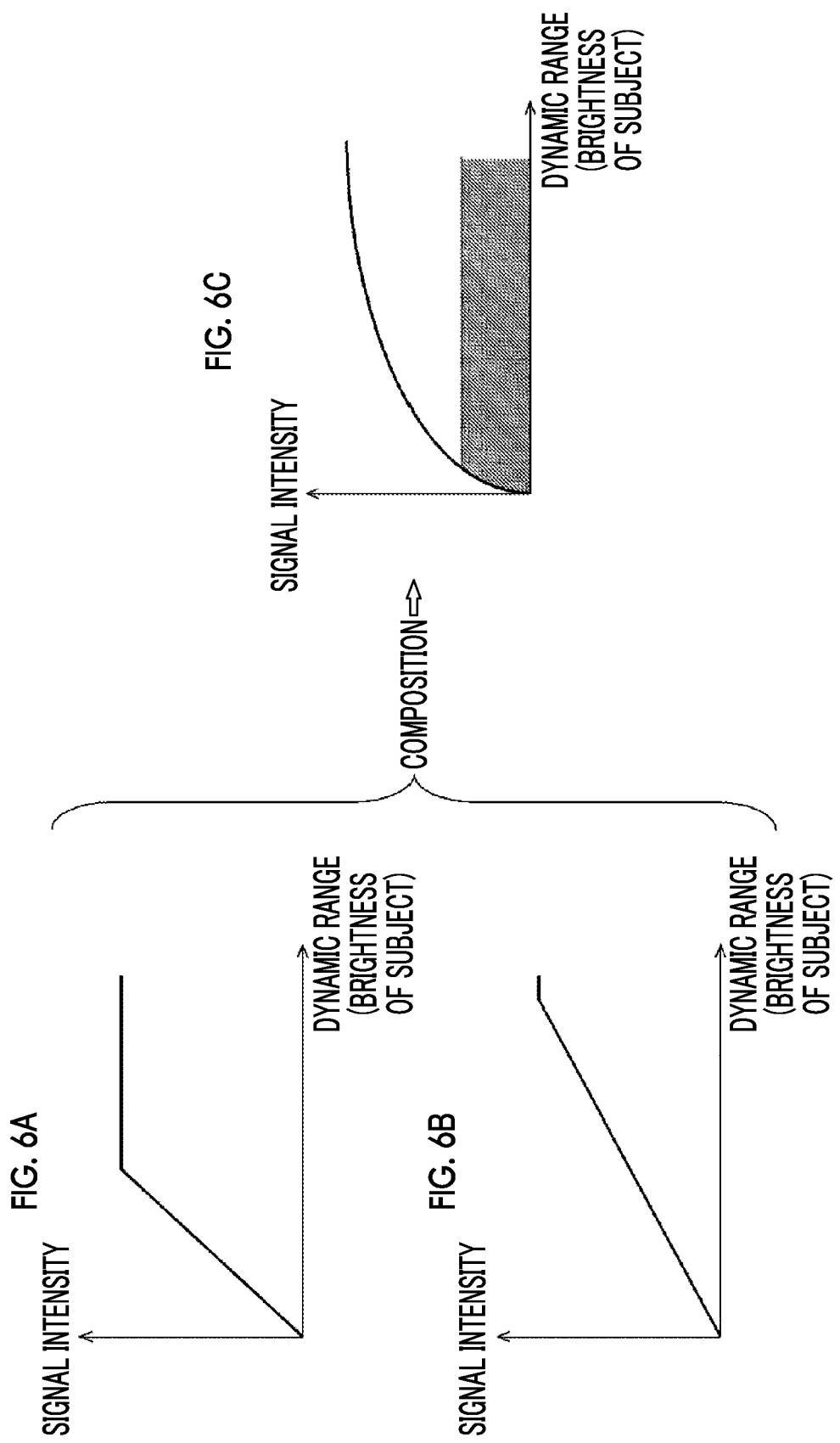

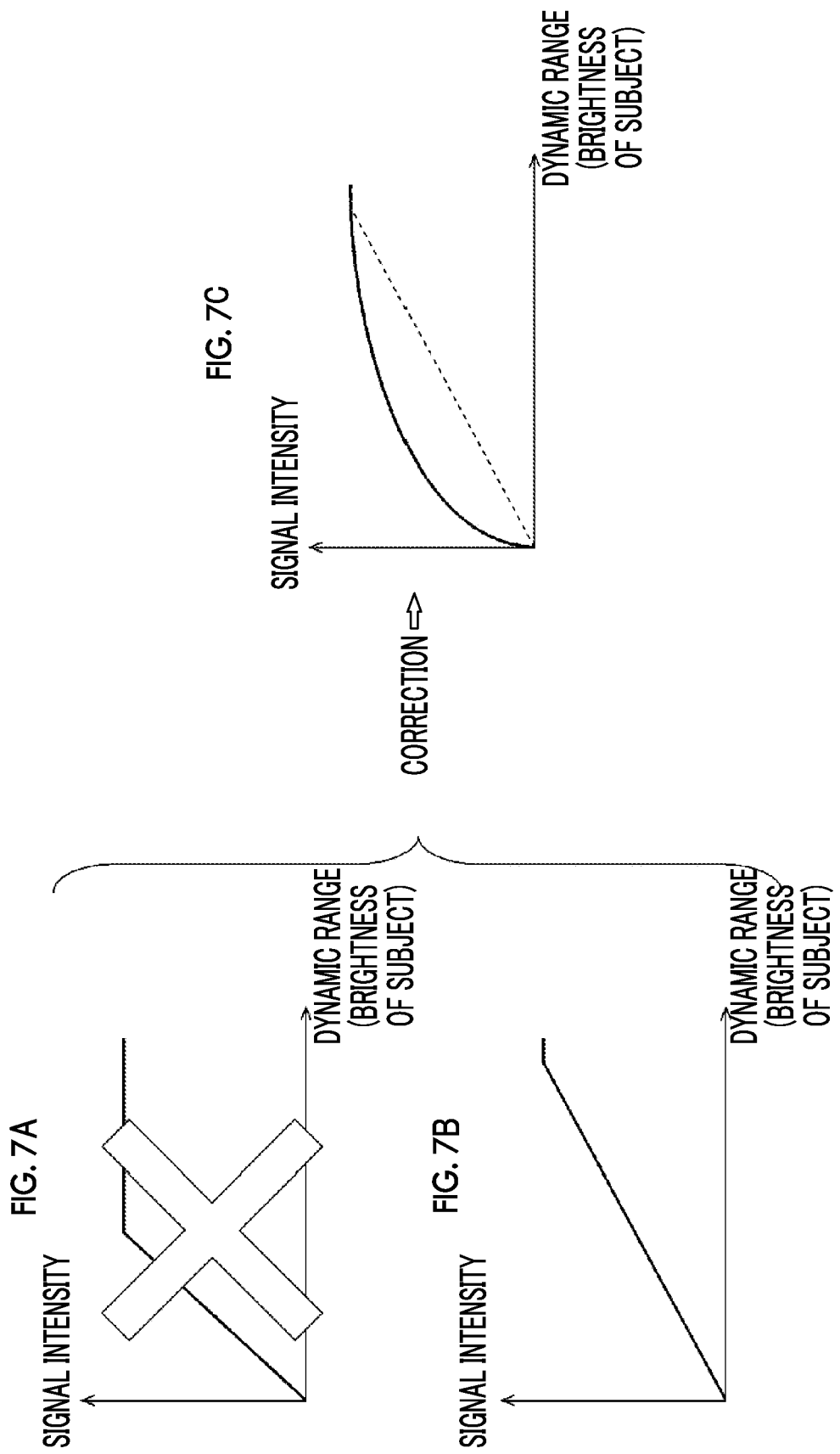

FIG. 11

| HDR METHOD | EXPOSURE TIME OF NORMAL IMAGE | EXPOSURE TIME OF HDR IMAGE | ISO SENSITIVITY OF NORMAL IMAGE | ISO SENSITIVITY OF HDR IMAGE |
|---|---|---|---|---|
| M-HDR (SENSITIVITY) | 16 ms | 16 ms | ISO3200 | ISO1600 |
| M-HDR (SS) | 22 ms | 11 ms | ISO3200 | ISO3200 |
| S-HDR | 33 ms | | ISO3200 (1600) | |

FIG. 16

| HDR METHOD | EXPOSURE TIME OF NORMAL IMAGE | EXPOSURE TIME OF HDR IMAGE | ISO SENSITIVITY OF NORMAL IMAGE | ISO SENSITIVITY OF HDR IMAGE |
|---|---|---|---|---|
| M-HDR (SENSITIVITY) | 0.125 ms | 0.125 ms | ISO100 | ISO50 |
| M-HDR (SS) | 0.125 ms | 0.0625 ms | ISO100 | ISO100 |
| S-HDR | 0.125 ms | | ISO100 (50) | ISO100 |

IMAGING APPARATUS, IMAGING METHOD, AND PROGRAM

CROSS-REFERENCE TO RELATED APPLICATIONS

This application is a Continuation of PCT International Application No. PCT/JP2018/024136 filed on Jun. 26, 2018, which claims priority under 35 U.S.C § 119(a) to Japanese Patent Application No. 2017-190536 filed on Sep. 29, 2017. Each of the above application(s) is hereby expressly incorporated by reference, in its entirety, into the present application.

BACKGROUND OF THE INVENTION

1. Field of the Invention

The present invention relates to an imaging apparatus, an imaging method, and a program and particularly, to a technology for a dynamic range expansion process in a motion picture.

2. Description of the Related Art

In a case where a captured image of a subject having a wide dynamic range is acquired by a digital camera or the like, a white void of a bright part or a black solid of a dark part may occur. One method of representing a wider dynamic range of the subject in the captured image is a dynamic range expansion process (high dynamic range (HDR)).

One method of the dynamic range expansion process is a method of acquiring an image in which a dynamic range is expanded by acquiring a plurality of captured images having different exposure conditions and obtaining one composite image.

Another method of the dynamic range expansion process is a process of appropriately setting brightness of an output signal by applying a tone curve that decreases the black solid of the dark part or the white void of the bright part to an input signal.

For example, JP2010-239277A discloses a technology for selectively acquiring a wide dynamic range image prioritizing blur reduction or a wide dynamic range image prioritizing resolution. Specifically, in JP2010-239277A, a plurality of pixel groups are included, and a technology for acquiring a desired wide dynamic range image by separately using first imaging of generating a plurality of individual pixel group images by performing exposure once in an exposure time different for each pixel group and second imaging of generating a plurality of high resolution images by consecutively performing exposure a plurality of times in each different exposure time of one exposure using the plurality of pixel groups as one high resolution pixel group and compositing a plurality of acquired images is disclosed.

In addition, for example, JP2014-146850A discloses a technology for controlling an interplane HDR and an in-plane HDR depending on a motion amount of the subject. The interplane HDR is a technology for obtaining a captured image in which the dynamic range is expanded by compositing a plurality of consecutively captured images. The in-plane HDR is a technology for acquiring a plurality of images having different exposure amounts based on imaging of one frame by setting a different exposure time (charge accumulation time) for each predetermined unit region (for example, a row) and performing reading, and obtaining an image in which the dynamic range is expanded by compositing the images.

SUMMARY OF THE INVENTION

JP2010-239277A and JP2014-146850A disclose a method of performing the dynamic range expansion process by acquiring a plurality of captured images in different exposure times and obtaining one composite image. This method is effective means for enabling acquisition of an image of high image quality in a case where a scene is bright and the exposure time is short. However, in a case where the scene is dark and it is necessary to increase the exposure time, it is necessary to further increase the exposure time in order to acquire a plurality of captured images, and there is a possibility of blurriness of a subject image.

In addition, in a digital camera that employs only the method of the dynamic range expansion process of obtaining one composite image from a plurality of captured images as disclosed in JP2010-239277A and JP2014-146850A, exposure may be performed beyond a time of one frame period set in a user setting or specifications. For example, in the method of the dynamic range expansion process disclosed in JP2010-239277A and JP2014-146850A, in a case where the dark scene is imaged, a plurality of captured images in which the exposure time is increased in order to obtain a light intensity have to be obtained, and a case where the total exposure time exceeds the time of one frame period may occur.

The present invention is conceived in view of the above matter. An object of the present invention is to provide an imaging apparatus, an imaging method, and a program capable of performing an appropriate dynamic range expansion process in a dark scene and a bright scene while reducing blurriness of a subject image and maintaining a set frame rate.

In order to achieve the object, an imaging apparatus that is one aspect of the present invention comprises an imager that images a motion picture of a subject, and a processor configured to perform a dynamic range expansion process by causing the imager to capture a plurality of captured images having different exposure conditions in correspondence with a frame rate of the motion picture and generating one composite image from the plurality of captured images, perform a dynamic range expansion process by causing the imager to capture one captured image in correspondence with the frame rate of the motion picture and correcting an output value of a signal of the one captured image, and execute the dynamic range expansion process by generating one composite image from the plurality of captured images or the dynamic range expansion process by correcting the output value of the signal of the one captured image, based on a time of one frame period of the frame rate and a total exposure time in a case of capturing the plurality of captured images in the dynamic range expansion process by generating one composite image from the plurality of captured images.

According to the present aspect, the imaging apparatus includes the processor configured to perform the dynamic range expansion process by causing the imager to capture the plurality of captured images having different exposure conditions in correspondence with the frame rate of the motion picture and generating one composite image from the plurality of captured images, and perform the dynamic range expansion process by causing the imager to capture one captured image in correspondence with the frame rate of the motion picture and correcting the output value of the signal of the one captured image. Accordingly, in the present aspect, by separately using the dynamic range expansion process by generating one composite image from the plurality of captured images and the dynamic range expansion process by correcting the output value of the signal of the one captured image, an appropriate dynamic range expansion process corresponding to a dark scene or a bright scene can be performed with reduction in blurriness of the subject. In addition, the processor configured to control the dynamic range expansion process by generating one composite image from the plurality of captured images or the dynamic range expansion process by correcting the output value of the signal of the one captured image, based on the time of one frame period of the frame rate and the total exposure time in a case of capturing the plurality of captured images in the dynamic range expansion process by generating one composite image from the plurality of captured images. Accordingly, in the present aspect, an appropriate dynamic range expansion process can be performed while the set frame rate is maintained.

It is preferable that the processor configured to change the exposure condition by changing the exposure time.

According to the present aspect, the dynamic range expansion process is performed based on the plurality of captured images captured by changing the exposure time.

It is preferable that the processor configured to execute the dynamic range expansion process by generating one composite image from the plurality of captured images or the dynamic range expansion process by correcting the output value of the signal of the one captured image, based on a comparison result between the time of one frame period and the total exposure time in a case of capturing the plurality of captured images in the dynamic range expansion process by generating one composite image from the plurality of captured images.

According to the present aspect, the execution of the dynamic range expansion process is controlled based on the comparison result between the time of one frame period and the total exposure time in a case of capturing the plurality of captured images in the dynamic range expansion process by generating one composite image from the plurality of captured images.

It is preferable that the processor configured to execute the dynamic range expansion process by generating one composite image from the plurality of captured images in a case where the time of one frame period is longer than or equal to the total exposure time in a case of capturing the plurality of captured images in the dynamic range expansion process by generating one composite image from the plurality of captured images, and wherein the processor configured to execute the dynamic range expansion process by correcting the output value of the signal of the one captured image in a case where the time of one frame period is shorter than the total exposure time in a case of capturing the plurality of captured images in the dynamic range expansion process by generating one composite image from the plurality of captured images.

According to the present aspect, in a case where the time of one frame period is longer than or equal to the total exposure time in a case of capturing the plurality of captured images in the dynamic range expansion process by generating one composite image from the plurality of captured images, the processor configured to execute the dynamic range expansion process by generating one composite image from the plurality of captured images. Meanwhile, according to the present aspect, in a case where the time of one frame period is shorter the total exposure time in a case of capturing the plurality of captured images in the dynamic range expansion process by generating one composite image from the plurality of captured images, the processor configured to execute the dynamic range expansion process by correcting the output value of the signal of the one captured image.

It is preferable that the processor configured to cause the imager to capture a first captured image and a second captured image having a shorter exposure time than the first captured image and generate the composite image from the first captured image and the second captured image.

According to the present aspect, the processor configured to cause the imager to capture the first captured image and the second captured image having a shorter exposure time than the first captured image and generate the composite image from the first captured image and the second captured image.

It is preferable that the processor configured to cause the imager to capture a first captured image, a second captured image having a shorter exposure time than the first captured image, and a third captured image having a shorter exposure time than the second captured image and generate the composite image from the first captured image, the second captured image, and the third captured image.

According to the present aspect, the processor configured to cause the imager to capture the first captured image, the second captured image having a shorter exposure time than the first captured image, and the third captured image having a shorter exposure time than the second captured image and generate the composite image from the first captured image, the second captured image, and the third captured image.

It is preferable that the processor configured to change the exposure condition by changing ISO sensitivity.

According to the present aspect, the processor configured to perform the dynamic range expansion process by generating one composite image from the plurality of captured images, based on the plurality of captured images captured by changing the ISO sensitivity.

It is preferable that the processor configured to change ISO sensitivity of the captured image captured by the imager, and execute the dynamic range expansion process by generating one composite image from the plurality of captured images or the dynamic range expansion process by correcting the output value of the signal of the one captured image, based on the time of one frame period and the total exposure time in a case of capturing the plurality of captured images in the dynamic range expansion process by generating one composite image from the plurality of captured images, the total exposure time including the exposure time in a case of capturing the plurality of captured images by decreasing the ISO sensitivity.

According to the present aspect, the dynamic range expansion process is controlled based on the time of one frame period and the total exposure time in a case of capturing the plurality of captured images in the dynamic range expansion process by generating one composite image from the plurality of captured images. The total exposure time includes the exposure time in a case of capturing the plurality of captured images by decreasing the ISO sensitivity.

It is preferable that the processor configured to change ISO sensitivity of the captured image captured by the imager, and execute the dynamic range expansion process by generating one composite image from the plurality of captured images or the dynamic range expansion process by correcting the output value of the signal of the one captured image, based on a comparison result between the time of one frame period and the total exposure time in a case of capturing the plurality of captured images in the dynamic range expansion process by generating one composite image from the plurality of captured images, the total exposure time including the exposure time in a case of capturing the plurality of captured images by decreasing the ISO sensitivity.

According to the present aspect, the execution of the dynamic range expansion process is controlled based on the comparison result between the time of one frame period and the total exposure time in a case of capturing the plurality of captured images in the dynamic range expansion process by generating one composite image from the plurality of captured images. The total exposure time includes the exposure time in a case of capturing the plurality of captured images by decreasing the ISO sensitivity.

It is preferable that in a case where the time of one frame period is longer than or equal to the total exposure time including the exposure time in a case of capturing the plurality of captured images by decreasing the ISO sensitivity by, the processor configured to capture at least one captured image of the plurality of captured images by changing the ISO sensitivity.

According to the present aspect, in a case where the time of one frame period is longer than or equal to the total exposure time including the exposure time in a case of capturing the plurality of captured images by decreasing the ISO sensitivity, at least one captured image of the plurality of captured images is captured by changing the ISO sensitivity.

It is preferable that an ND filter is disposed in the imager, and the processor configured to execute the dynamic range expansion process based on the captured image captured by the imager in which the ND filter is disposed.

According to the present aspect, the processor configured to execute the dynamic range expansion process based on the captured image captured by the imager in which the ND filter is disposed.

It is preferable that the ND filter that is insertable and withdrawable is disposed in the imager, and the processor configured to generate the composite image from the captured image captured by the imager in which the ND filter is disposed, and the captured image captured by the imager in which the ND filter is not disposed.

According to the present aspect, the composite image is generated from the captured image captured by the imager in which the ND filter is disposed, and the captured image captured by the imager in which the ND filter is not disposed.

It is preferable that the processor configured to record a switching point of the dynamic range expansion process between the dynamic range expansion process by generating one composite image from the plurality of captured images and the dynamic range expansion process by correcting the output value of the signal of the one captured image.

According to the present aspect, the processor configured to record a switching point of the dynamic range expansion process between the dynamic range expansion process by generating one composite image from the plurality of captured images and the dynamic range expansion process by correcting the output value of the signal of the one captured image.

It is preferable that the processor configured to record the switching point in a header of a file of the motion picture or a file different from the file of the motion picture.

According to the present aspect, the processor configured to record the switching point in the header of the file of the motion picture or the file different from the file of the motion picture.

It is preferable that after an elapse of a predetermined time from first switching of the dynamic range expansion process between the dynamic range expansion process by generating one composite image from the plurality of captured images and the dynamic range expansion process by correcting the output value of the signal of the one captured image, the processor configured to perform second switching of the dynamic range expansion process between the dynamic range expansion process by generating one composite image from the plurality of captured images and the dynamic range expansion process by correcting the output value of the signal of the one captured image.

According to the present aspect, in a case where the predetermined time does not elapse from the first switching of the dynamic range expansion process between the dynamic range expansion process by generating one composite image from the plurality of captured images and the dynamic range expansion process by correcting the output value of the signal of the one captured image, the processor configured not to perform the subsequent switching of the dynamic range expansion process.

It is preferable that the processor configured to generate the composite image using the plurality of captured images captured in different frames.

According to the present aspect, the processor configured to generate the composite image using the plurality of captured images captured in different frames.

It is preferable that in imaging performed by the imager, the processor configured to determine whether or not a shutter speed is changeable and execute the dynamic range expansion process by generating one composite image from the plurality of captured images or the dynamic range expansion process by correcting the output value of the signal of the one captured image in a case where the shutter speed is changeable.

According to the present aspect, the processor configured to determine whether or not the shutter speed is changeable and performs the dynamic range expansion process of the present invention in a case where the shutter speed is changeable.

An imaging method that is another aspect of the present invention is an imaging method of an imaging apparatus including an imager that images a motion picture of a subject, and the processor configured to perform a dynamic range expansion process by causing the imager to capture a plurality of captured images having different exposure conditions in correspondence with a frame rate of the motion picture and generating one composite image from the plurality of captured images, and to perform the dynamic range expansion process by causing the imager to capture one captured image in correspondence with the frame rate of the motion picture and correcting an output value of a signal of the one captured image. The method comprises a step of controlling execution of the dynamic range expansion process by generating one composite image from the plurality of captured images or the dynamic range expansion process by correcting the output value of the signal of the one captured image, based on a time of one frame period of the frame rate and a total exposure time in a case of capturing the plurality of captured images in the dynamic range expansion process by generating one composite image from the plurality of captured images.

A program that is another aspect of the present invention is a program causing a computer to execute an imaging method of an imaging apparatus including an imager that images a motion picture of a subject, and the processor configured to perform a dynamic range expansion process by causing the imager to capture a plurality of captured images having different exposure conditions in correspondence with a frame rate of the motion picture and generating one composite image from the plurality of captured images, and to perform the dynamic range expansion process by causing the imager to capture one captured image in correspondence with the frame rate of the motion picture and correcting an output value of a signal of the one captured image. The program causes the computer to execute the imaging method including a step of controlling execution of the dynamic range expansion process by generating one composite image from the plurality of captured images or the dynamic range expansion process by correcting the output value of the signal of the one captured image, based on a time of one frame period of the frame rate and a total exposure time in a case of capturing the plurality of captured images in the dynamic range expansion process by generating one composite image from the plurality of captured images.

According to the present invention, by separately using the dynamic range expansion process of the first dynamic range expansion processing unit and the second dynamic range expansion processing unit, an appropriate dynamic range expansion process corresponding to a dark scene or a bright scene can be performed with reduction in blurriness of the subject. The control unit controls the dynamic range expansion process performed by the first dynamic range expansion processing unit or the second dynamic range expansion processing unit based on the time of one frame period of the frame rate and the total exposure time in a case of capturing the plurality of captured images in the first dynamic range expansion processing unit. Thus, an appropriate dynamic range expansion process can be performed while the set frame rate is maintained.

BRIEF DESCRIPTION OF THE DRAWINGS

FIGS. 6A to 6C are a diagram illustrating an example of generating a composite image in an M-HDR process.
FIGS. 7A to 7C are a diagram illustrating an example of generating a corrected image in an S-HDR process.
FIG. 11 is a diagram illustrating a relationship between the exposure time and ISO sensitivity.

FIG. 16 is a diagram describing acquisition of a plurality of captured images having different exposure conditions.

DESCRIPTION OF THE PREFERRED EMBODIMENTS

Hereinafter, an imaging apparatus, an imaging method, and a program according to a preferred embodiment of the present invention will be described in accordance with the appended drawings.

Figure 1:
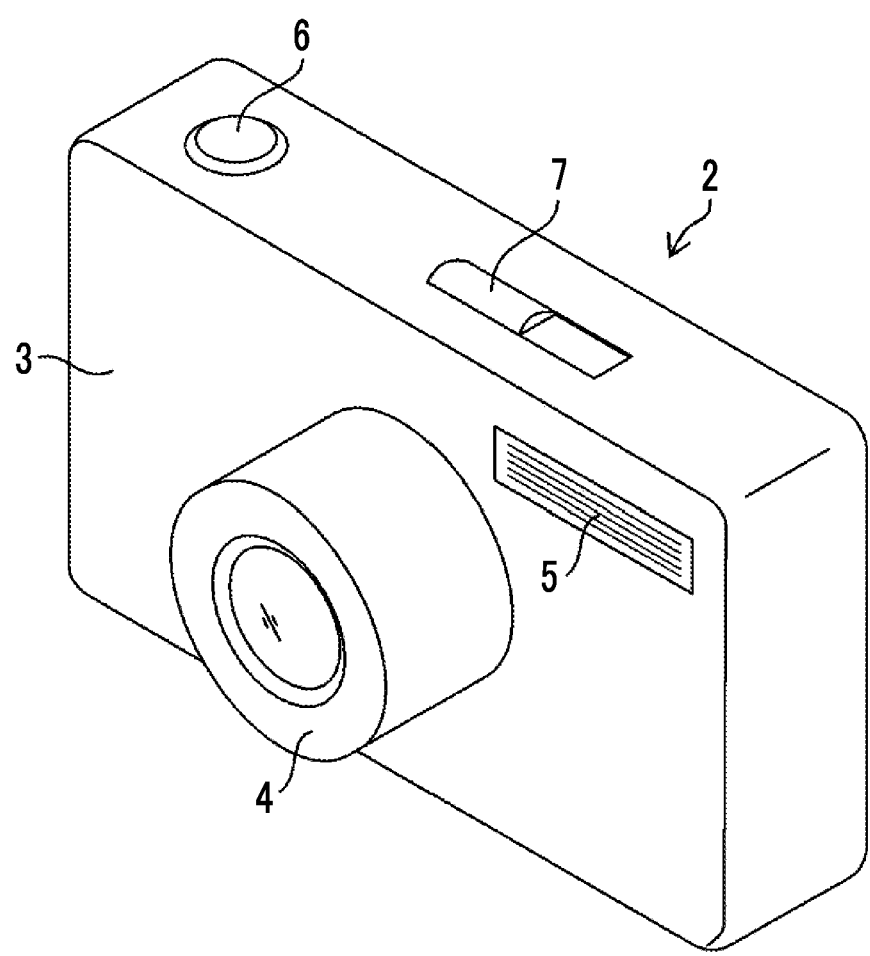
FIG. 1 is a perspective front view of a digital camera.
Figure 2:
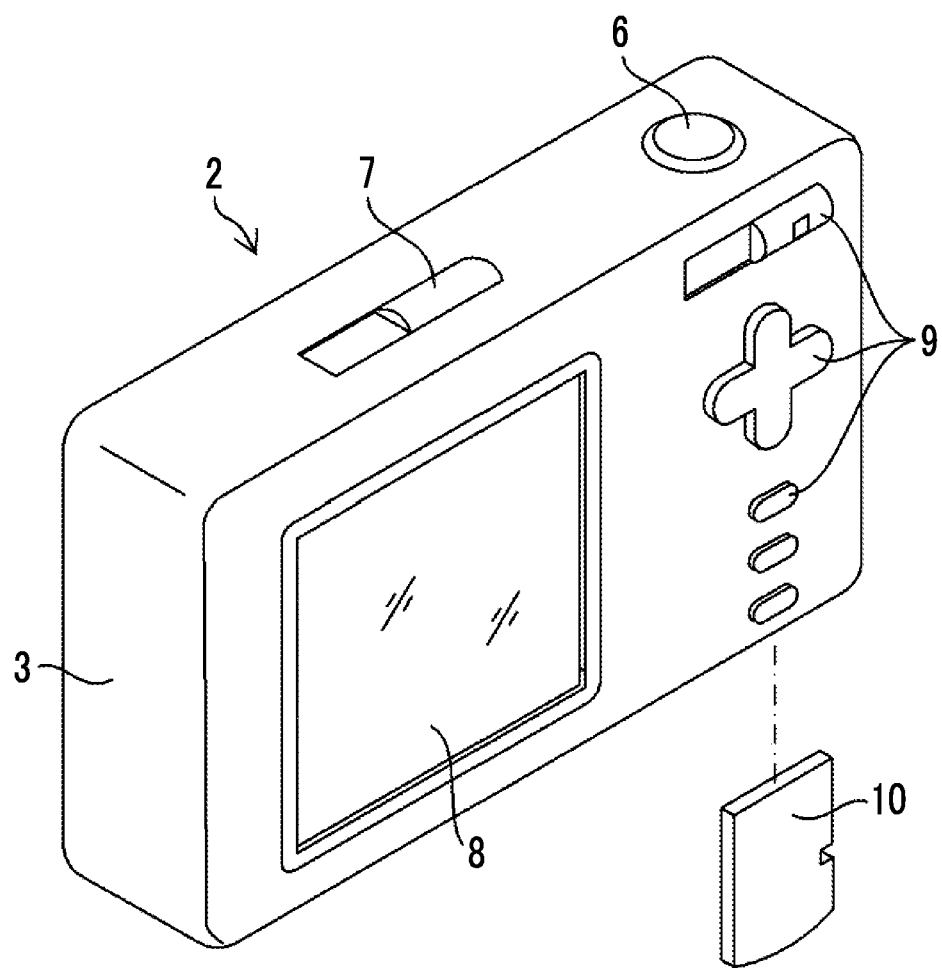
FIG. 2 is a perspective rear view of the digital camera.

FIG. 1 is a perspective front view of a digital camera 2 that is the imaging apparatus according to the embodiment of the present invention. FIG. 2 is a perspective rear view of the digital camera 2.

The digital camera 2 comprises a camera main body 3 and a lens barrel 4 attached to a front surface of the camera main body 3. The lens barrel 4 and the camera main body 3 may be integrated or may be attachably and detachably disposed as an interchangeable lens type camera.

A flash light emission unit 5 is disposed on the front surface of the camera main body 3 in addition to the lens barrel 4. A shutter button 6 and a power supply switch 7 are disposed on an upper surface of the camera main body 3. The shutter button 6 is an imaging instruction unit that receives an imaging instruction from a user, and is configured with a two-stage stroke type switch that includes an S1 switch which is switched ON at a time of a half push, and an S2 switch which is switched ON at a time of a full push. The power supply switch 7 is a power supply switching unit that receives an instruction to switch a power supply of the digital camera 2 ON and OFF from the user.

A display unit 8 configured with a liquid crystal panel or the like and an operation unit 9 directly operated by the user are disposed on the rear surface of the camera main body 3. In an imaging standby state, the display unit 8 functions as an electronic viewfinder by displaying a live view image (live preview image). When a captured image or an image stored in a memory is played back, the display unit 8 functions as a playback image display unit.

The operation unit 9 is configured with any operation device such as a mode switch, a cross key, and an execution key. For example, the mode switch is operated by the user in a case where an operation mode of the digital camera 2 is switched. The operation mode of the digital camera 2 includes an imaging mode (an auto imaging mode, a manual imaging mode, a consecutive capturing mode, and the like) for obtaining the captured image by imaging a subject, a playback mode in which the image is displayed and played back, and the like.

The auto imaging mode is a mode in which an autofocus (AF) function of automatically performing focus adjustment, an automatic exposure (auto exposure (AE)) function of automatically setting an F number and a shutter speed, and the like are used. The manual imaging mode is a mode in which the user can appropriately set the focus adjustment, the F number, the shutter speed, and the like using the operation unit 9.

The cross key and the execution key are operated by the user in a case where a menu screen or a setting screen is displayed on the display unit 8, a cursor displayed in the menu screen or the setting screen is moved, or various settings of the digital camera 2 are confirmed.

A memory slot into which an external memory 10 is mounted, and a mounting lid that opens and closes an opening of the memory slot are disposed in a bottom portion (not illustrated) of the camera main body 3. The external memory 10 is disposed to be attachable and detachable with respect to the camera main body 3. In a case where the external memory 10 is mounted in the camera main body 3, the external memory 10 is electrically connected to a storage control unit 33 disposed in the camera main body 3. The external memory 10 can be generally configured with a semiconductor memory such as a card type flash memory but is not particularly limited. A storage medium of any storage method such as a magnetic medium can be used as the external memory 10.

First Embodiment

Figure 3:
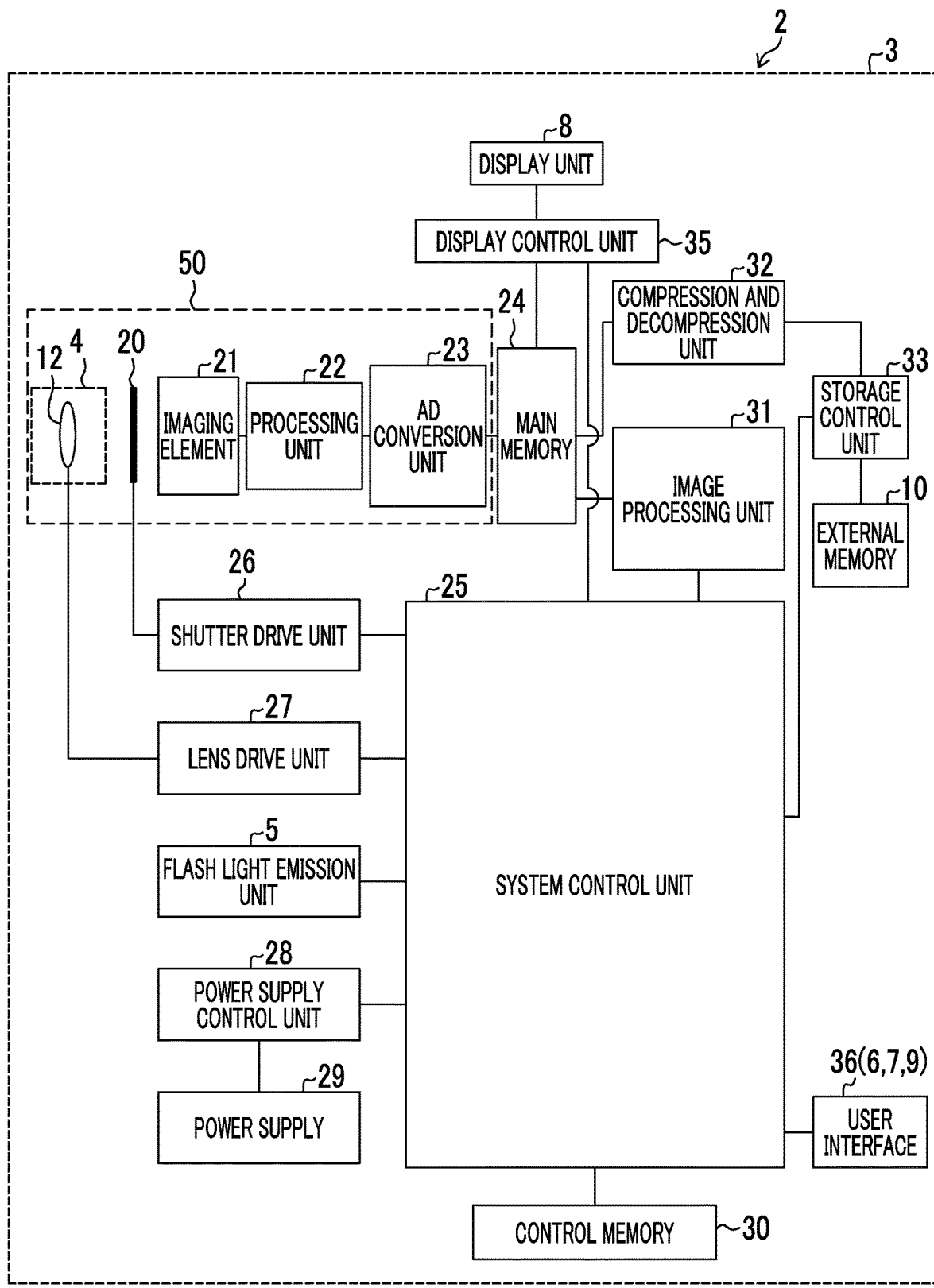
FIG. 3 is a block diagram illustrating a control processing system of the digital camera.

FIG. 3 is a block diagram illustrating a control processing system of the digital camera 2 of the present embodiment.

Subject light passes through a lens unit 12 disposed in the lens barrel 4 and a mechanical shutter 20 disposed in the camera main body 3 and is received by an imaging element 21. The lens unit 12 is configured with an imaging optical system that includes an imaging lens (lens group) and a stop. The imaging element 21 is an element that generates an imaging signal (image data) by receiving a subject image. The imaging element 21 includes a color filter of red, green, blue (RGB) and the like and an image sensor such as a charge coupled device (CCD) or a complementary metal oxide semiconductor (CMOS) that converts an optical image into an electric signal. The image data output from the imaging element 21 is processed by an automatic gain control (AGC) circuit or the like in a processing unit 22. Then, the image data in an analog format is converted into image data in a digital format by an analog digital (AD) conversion unit 23. The digitized image data is stored in a main memory 24. The digital camera 2 acquires a motion picture by consecutively acquiring the image data. An imaging unit 50 is configured with the lens unit 12, the lens barrel 4, the mechanical shutter 20, the imaging element 21, and the AD conversion unit 23.

The main memory 24 is a region that temporarily stores the image data, and is configured with a dynamic random access memory (DRAM) or the like. The image data that is transmitted from the AD conversion unit 23 and accumulated in the main memory 24 is read out by an image processing unit 31 that is controlled by a system control unit 25. The image processing unit 31 performs various image processing such as white balance correction, gamma-correction processing, and a demosaicing process using the image data generated by the imaging element 21 as input image data, and stores the image data after image processing in the main memory 24 again.

The image data that is subjected to image processing in the image processing unit 31 and stored in the main memory 24 is read out by a display control unit 35 and a compression and decompression unit 32. The display control unit 35 controls the display unit 8 and displays the image data read out from the main memory 24 on the display unit 8. The image data that is output from the imaging element 21 and subjected to image processing in the image processing unit 31 is displayed on the display unit 8 as an imaging check image (post view image).

The compression and decompression unit 32 creates image data of any compression format such as Joint Photographic Experts Group (JPEG) or Tagged Image File Format (TIFF) by performing a compression process on the image data read out from the main memory 24. The image data after the compression process is stored in the external memory 10 by a storage control unit 33 that controls a process of storing data in the external memory 10 and a process of reading out data from the external memory 10. Imaging information is added to the image data in any format. For example, Exchangeable image file format (Exif) can be employed. In addition, motion picture data is stored in the main memory 24 in any motion picture format such as Audio Video Interleave (AVI) and MP4.

In the playback mode in which the image data stored in the external memory 10 is played back, the image data stored in the external memory 10 is read out by the storage control unit 33 controlled by the system control unit 25, is subjected to a decompression process by the compression and decompression unit 32, and then, is stored in the main memory 24. Then, in the same procedure as a display for checking the captured image, the image data is read out from the main memory 24 by the display control unit 35, and the image data is displayed and played back on the display unit 8.

In a case where a first stage push (half push) of the shutter button 6 occurs, an AF processing function of the digital camera 2 performs integrating accumulation on absolute values of high-frequency components of the image data corresponding to an AF area obtained at a time of the half push and outputs an integrating accumulation value (AF evaluation value) to the system control unit 25.

In a case where the first stage push (half push) of the shutter button 6 occurs, an AE detection function performs integrating accumulation on a digital signal corresponding to the entire screen, performs integrating accumulation on the image data in which different weights are applied to a screen center part and an edge part, and outputs an integrating accumulation value to the system control unit 25.

While the system control unit 25 controls the main memory 24, the image processing unit 31, and the storage control unit 33 as described above, the system control unit 25 also controls each of other units (the AF processing function and the AE detection function) in the digital camera 2.

For example, in a case where the shutter button 6 is half pushed at a time of the auto imaging mode, the system control unit 25 moves a focus lens of the lens unit 12 from a closest point to an infinity side through a lens drive unit 27 and acquires the AF evaluation value at each lens position from the AF processing function by operating the AF processing function. Then, the focus adjustment to the subject (main subject) is performed by searching for a focal position having the maximum AF evaluation value and moving the focus lens to the focal position. In addition, in a case where the shutter button 6 is half pushed at the time of the auto imaging mode, the system control unit 25 operates the AE detection function, calculates subject brightness (imaging Ev value) from the integrating accumulation value input from the AE detection function, and decides the F number of the stop and the shutter speed (a charge accumulation time of the mechanical shutter 20 and/or the imaging element 21) based on the imaging Ev value in accordance with a program line diagram. In a case where the shutter button 6 is fully pushed, the system control unit 25 controls the stop based on the decided F number, controls the mechanical shutter 20 through a shutter drive unit 26 based on the decided shutter speed, and controls the charge accumulation time in the imaging element 21 through an imaging element drive unit, not illustrated.

In addition, the system control unit 25 controls emission and non-emission of flash light by controlling the flash light emission unit 5. For example, the flash light emission unit 5 of the present example includes a xenon tube emitting white flash light and one or two or more color filters inserted and withdrawn between the xenon tube and a light emission window. The system control unit 25 adjusts a light emission intensity of the flash light by adjusting a light emission time of the xenon tube and adjusts a light emission color of the flash light by inserting and withdrawing the color filter. Instead of the xenon tube, the flash light emission unit 5 may use light emitting diodes of red (R), green (G), and blue (B). In this case, the flash light of any color can be emitted by adjusting the light emission intensity using a current amount flowing in the light emitting diodes of RGB and adjusting a ratio of the light emission intensities of the light emitting diodes of RGB.

Furthermore, the system control unit 25 detects whether or not a battery is mounted in a power supply 29, a type of battery, a remaining battery level, and the like by controlling a power supply control unit 28. In addition, the system control unit 25 controls various processing units constituting the image processing unit 31.

Furthermore, the system control unit 25 acquires an operation signal from a user interface 36 including the shutter button 6, the power supply switch 7, and the operation unit 9 and performs various processes and device control corresponding to the operation signal. In addition, the system control unit 25 controls the power supply control unit 28 depending on a power supply ON and OFF signal received from the power supply switch 7 and controls switching ON and OFF of the power supply 29.

A program and data necessary for the various processes and the device control performed by the system control unit 25 are stored in a control memory 30. The system control unit 25 can read out the program and the data stored in the control memory 30 as necessary. In addition, the system control unit 25 can store a new program and data in the control memory 30.

Figure 4:
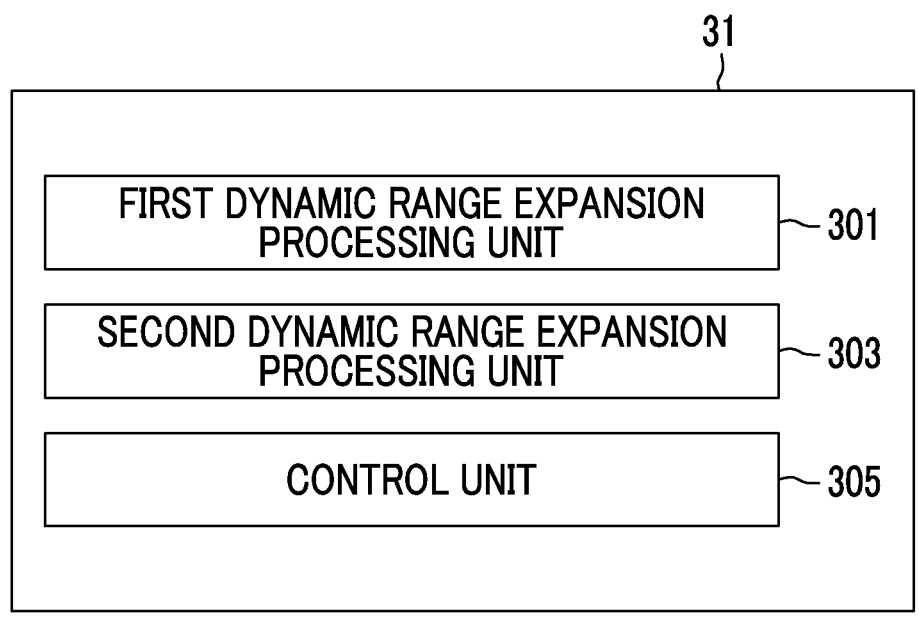
FIG. 4 is a block diagram illustrating functions of an image processing unit.

FIG. 4 is a block diagram illustrating functions of the image processing unit 31 in the present embodiment. The image processing unit 31 of the present embodiment comprises a first dynamic range expansion processing unit 301, a second dynamic range expansion processing unit 303, and a control unit 305.

The first dynamic range expansion processing unit 301 performs a dynamic range expansion process by generating one composite image from a plurality of captured images having different exposure conditions (M-HDR process). The plurality of captured images having different exposure conditions are captured in correspondence with a frame rate of the motion picture and, for example, are captured by the imaging unit 50 in one frame period of a frame rate set in the digital camera 2.

For example, the first dynamic range expansion processing unit 301 causes the imaging unit 50 to acquire the plurality of captured images by changing the exposure time to change the exposure condition. That is, the first dynamic range expansion processing unit 301 performs the dynamic range expansion process by generating the composite image based on the plurality of captured images having different exposure times (M-HDR (SS) process).

In addition, for example, the first dynamic range expansion processing unit 301 causes the imaging unit 50 to acquire the plurality of captured images by changing ISO sensitivity to change the exposure condition. That is, the first dynamic range expansion processing unit 301 performs the dynamic range expansion process by generating the composite image based on the plurality of captured images having different ISO sensitivity (M-HDR (sensitivity) process).

Figure 5:
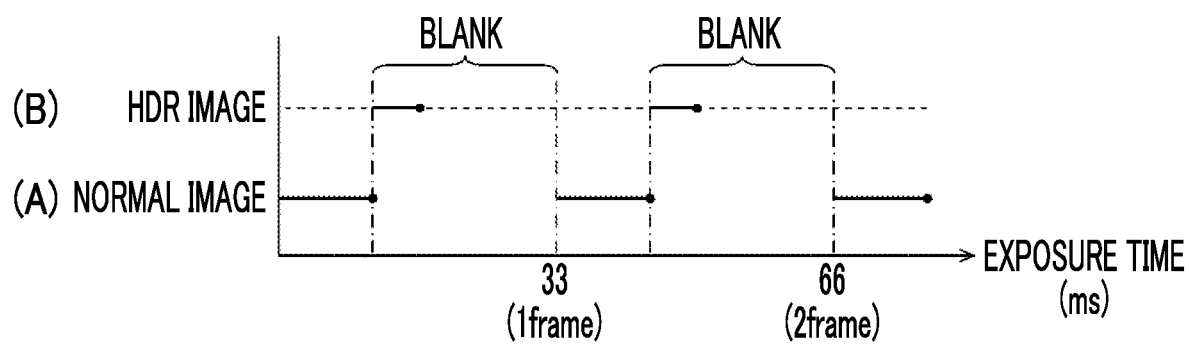
FIG. 5 is a diagram describing a relationship between a time of one frame period and an exposure time.

FIG. 5 is a diagram describing a relationship between a time of one frame period and the exposure time. In FIG. 5, the exposure times of a normal image and an HDR image in one frame period in a case where the frame rate is 30 frames per second (fps) are illustrated. As a method of performing the M-HDR process in the motion picture, a method of implementing the method by acquiring the HDR image within a time of a blank and compositing two or more images is suggested. The normal image is an image that is captured under an exposure condition conforming with a scene. The HDR image is an image that is captured under an underexposure condition compared to the exposure condition conforming with the scene. That is, in a case where the exposure condition is changed using the exposure time, the exposure time of the HDR image is shorter than the exposure time of the normal image. In addition, in a case where the exposure condition is changed using the ISO sensitivity, the ISO sensitivity of the HDR image is lower than the ISO sensitivity of the normal image.

In a case where the motion picture is imaged, the imaging is performed at a preset frame rate or a frame rate selected by the user. For example, in a case where the frame rate is 30 fps, the time of one frame period is 33.3 ms. In a case where the frame rate is 60 fps, the time of one frame period is 16.7 ms.

For example, in a case where the stop and the sensitivity are fixed and recording is performed at 30 fps, recorded brightness is constantly maintained by changing the exposure time of each frame to an exposure time of 0.3 ms (1/3000 seconds) under a clear sky and to an exposure time of 16.7 ms (1/60 seconds) in shade. In addition, depending on a length of the exposure time, a blank time (blank) in which the exposure is not performed is present between frames.

FIGS. 6A to 6C is a diagram illustrating an example of generating the composite image in the M-HDR process. In FIG. 6A, a relationship between the dynamic range (brightness of the subject) and a signal intensity in the normal image is illustrated. In FIG. 6B, a relationship between the dynamic range (the brightness of the subject) and the signal intensity in the HDR image is illustrated.

The normal image illustrated in FIG. 6A has a longer exposure time than the HDR image. Accordingly, the normal image has a large number of white void pixels and a narrow dynamic range. Meanwhile, the normal image has a small black solid, and an effect of noise in a dark part is reduced.

The HDR image illustrated in FIG. 6B has a shorter exposure time than the normal image. Accordingly, the HDR image has a small number of white void pixels and a wide dynamic range. Meanwhile, the HDR image has a significant black solid, and the effect of the noise in the dark part is high.

FIG. 6C illustrates a diagram that schematically illustrates generation of the composite image performed in a first dynamic range expansion process. The generation of the composite image performed in the first dynamic range expansion process is performed by applying well-known technology. For example, in the generation of the composite image, a composite image having a wide dynamic range is generated by mainly using the HDR image having a short exposure time in a bright part. In addition, in the generation of the composite image, a composite image in which the effect of the noise in the dark part is reduced is generated by mainly using the normal image having a long exposure time in the dark part. A region of diagonal lines in FIG. 6C illustrates a region in which the normal image is mainly used. A region not having diagonal lines illustrates a region in which the HDR image is mainly used.

The second dynamic range expansion processing unit 303 performs the dynamic range expansion process by correcting an output value of a signal of one captured image (S-HDR process). In this case, one captured image is captured in one frame period by the imaging unit 50. In the second dynamic range expansion processing unit 303, the output value of the signal of the captured image is corrected using well-known technology. For example, the second dynamic range expansion processing unit 303 performs correction of applying a tone curve to the signal such that the black solid of the dark part and the white void of the bright part are decreased. The captured image that the imaging unit 50 is caused to capture by the second dynamic range expansion processing unit 303 is preferably the HDR image having a less exposure amount than the normal image. Correcting the output value of the signal of the HDR image can generate a corrected image having a large number of gradations.

FIGS. 7A to 7C are a diagram illustrating an example of generating the corrected image in the S-HDR process. Here, FIG. 7A and FIG. 7B correspond to FIG. 6A and FIG. 6B. The normal image captured under an exposure condition of a long exposure time is FIG. 7A, and the HDR image captured under an exposure condition of a short exposure time is FIG. 7B.

For example, in a case where the S-HDR process is performed, the HDR image is captured by the imaging unit 50. The corrected image is generated by applying the tone curve to the HDR image. In FIG. 7C, correction of increasing the signal intensity in the dark part and correction of reducing a degree of increase to reduce the white void in the bright part are performed on the HDR image illustrated in FIG. 7B.

The control unit 305 controls execution of the dynamic range expansion process of the first dynamic range expansion processing unit 301 or the second dynamic range expansion processing unit 303. That is, in the control unit 305, execution of the M-HDR process or the S-HDR process is controlled with respect to the image acquired by the imaging unit 50. Specifically, the control unit 305 executes the dynamic range expansion process of the first dynamic range expansion processing unit 301 or the second dynamic range expansion processing unit 303 based on the time of one frame period of the frame rate and a total exposure time in a case of capturing the plurality of captured images in the first dynamic range expansion processing unit 301.

For example, the control unit 305 may cause the first dynamic range expansion processing unit 301 or the second dynamic range expansion processing unit 303 to execute the dynamic range expansion process based on a comparison result between the time of one frame period and the total exposure time in a case of capturing the plurality of captured images in the first dynamic range expansion processing unit 301. As a specific example, the control unit 305 may compare magnitudes of the time of one frame period and the total exposure time. In a case where the time of one frame period is longer (larger), the control unit 305 may cause the first dynamic range expansion processing unit 301 to perform the dynamic range expansion process. In a case where the time of one frame period is shorter (smaller), the control unit 305 may cause the second dynamic range expansion processing unit 303 to perform the dynamic range expansion process.

In addition, for example, in a case where the time of one frame period is longer than or equal to the total exposure time in a case of capturing the plurality of captured images in the first dynamic range expansion processing unit 301, the control unit 305 causes the first dynamic range expansion processing unit 301 to execute the dynamic range expansion process (M-HDR process). In a case where the time of one frame period is shorter than the total exposure time in a case of capturing the plurality of captured images in the first dynamic range expansion processing unit 301, the control unit 305 causes the second dynamic range expansion processing unit 303 to execute the dynamic range expansion process (S-HDR process).

Figure 8A:
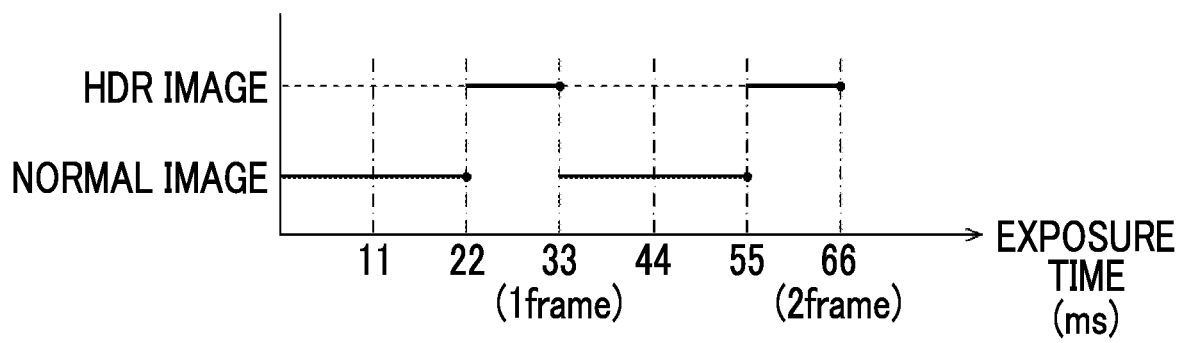
FIGS. 8A and 8B are diagrams describing control of a first dynamic range expansion process and a second dynamic range expansion process.
Figure 8B:
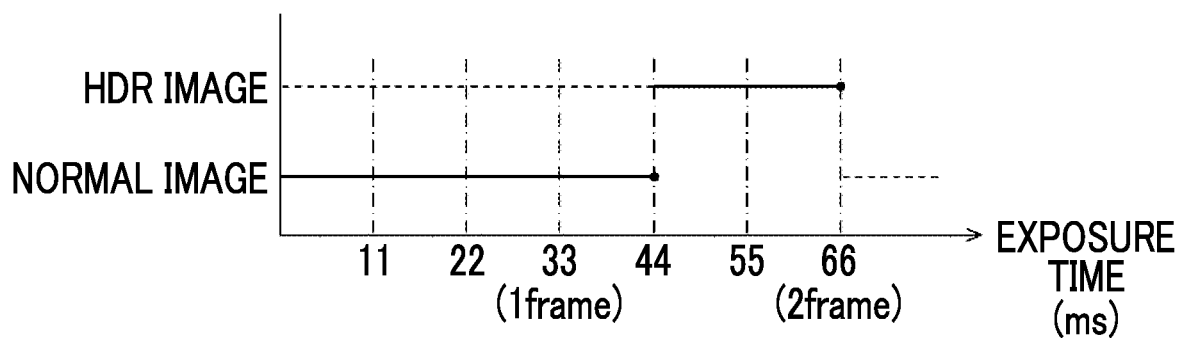

FIGS. 8A and 8B are diagrams describing control of the M-HDR process and the S-HDR process.

For example, in a case where the frame rate is 30 fps, the time of one frame period is 33.3 ms. In the M-HDR process that uses two images, in order to expand a DR of 1 Ev by fixing the ISO sensitivity, an exposure time of 11 ms:22 ms is necessary such that an exposure ratio of an image (HDR image) having a short exposure time to an image (normal image) having a long exposure time is 1:2. In a case where a total exposure time of the HDR image and the normal image is shorter than or equal to 33 ms (the time of one frame period at 30 fps) (FIG. 8A), the control unit 305 causes the first dynamic range expansion processing unit 301 to execute the expansion process.

In a case where a dark scene is imaged, the exposure time is 22 ms in the HDR image and 44 ms in the normal image, and the total exposure time is 66 ms (FIG. 8B), the total exposure time is longer than the time of one frame period. Thus, the control unit 305 causes the second dynamic range expansion processing unit 303 to perform the S-HDR process.

In a bright scene, the control unit 305 causes the first dynamic range expansion processing unit 301 to perform the M-HDR process in a case where the total exposure time is shorter than or equal to the time of one frame period. In the dark scene, performing the M-HDR process extends a display time of the same frame (changes the frame rate) in a case where the time of one frame period is shorter than the total exposure time. Thus, the control unit 305 causes the second dynamic range expansion processing unit 303 to perform the S-HDR process.

FIGS. 8A and 8B correspond to a case where one composite image is generated from two captured images by the first dynamic range expansion processing unit 301. Specifically, FIGS. 8A and 8B correspond to an example in which the first dynamic range expansion processing unit 301 causes the imaging unit 50 to capture a first captured image and a second captured image having a shorter exposure time than the first captured image and generates the composite image from the first captured image and the second captured image. The first dynamic range expansion processing unit 301 may generate one composite image from three captured images. Specifically, the first dynamic range expansion processing unit 301 may cause the imaging unit 50 to capture the first captured image, the second captured image having a shorter exposure time than the first captured image, and a third captured image having a shorter exposure time than the second captured image and generate the composite image from the first captured image, the second captured image, and the third captured image.

In addition, in the imaging by the imaging unit 50, the control unit 305 may execute the dynamic range expansion process of the present embodiment after determining whether or not the shutter speed is changeable. That is, in a case where the shutter speed is changeable, the control unit 305 causes the first dynamic range expansion processing unit 301 or the second dynamic range expansion processing unit 303 to execute the dynamic range expansion process.

Figure 9:
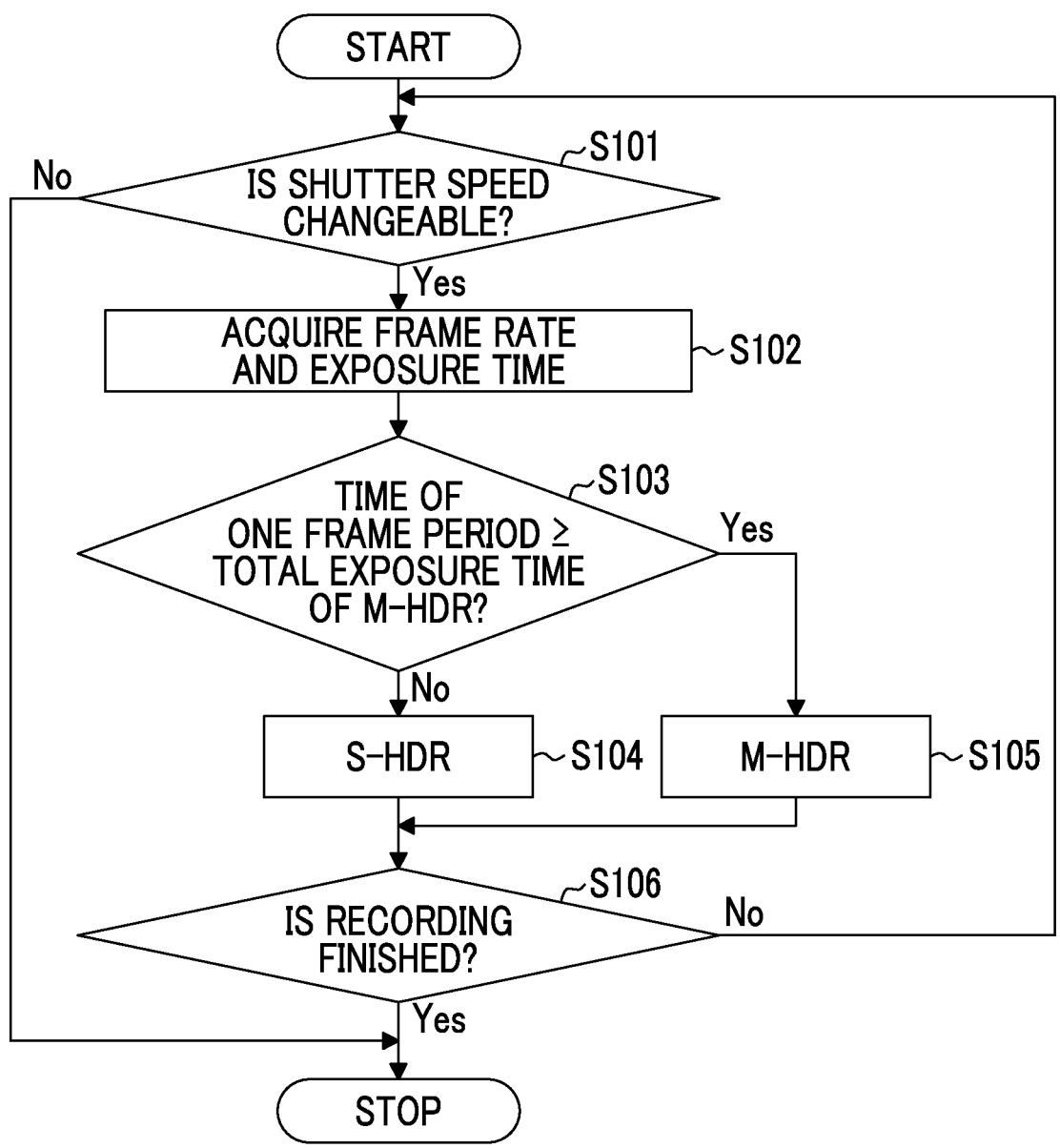
FIG. 9 is a flowchart illustrating an operation of the digital camera.

Next, an imaging step of the present embodiment will be described. FIG. 9 is a flowchart illustrating an operation of the digital camera 2.

First, in the digital camera 2, the control unit 305 determines whether or not the shutter speed can be changed (step S101). In a case where the user sets the shutter speed not to be changeable, the dynamic range expansion process of the present embodiment is stopped by the control unit 305 because a case that accompanies a change of the shutter speed occurs.

In a case where the shutter speed is changeable, the process of the present embodiment is executed. The control unit 305 acquires the frame rate set in the digital camera 2 and the exposure time conforming with the scene to be imaged (step S102). Specifically, the control unit 305 acquires the frame rate set by the user or the frame rate set in advance in the digital camera 2. In addition, for example, the control unit 305 acquires the exposure time that is automatically decided in the system control unit 25. The system control unit 25 calculates the exposure times of the normal image and the HDR image based on the live view image by the AE under a preset condition. The control unit 305 compares the total exposure time of the M-HDR process with the time of one frame period set in the digital camera 2 and determines whether to perform the S-HDR process or the M-HDR process on the captured image (step S103: control step). In a case where the total exposure time of the M-HDR process is longer than the time of one frame period, the S-HDR process is performed (step S104). That is, the second dynamic range expansion processing unit 303 executes the S-HDR process by causing the imaging unit 50 to acquire one captured image and correcting the acquired captured image by applying, for example, the tone curve.

In a case where the total exposure time of the M-HDR process is shorter than or equal to the time of one frame period, the M-HDR process is performed (step S105). That is, the first dynamic range expansion processing unit 301 executes the M-HDR process by causing the imaging unit 50 to acquire a plurality of captured images and compositing the plurality of acquired captured images.

Then, the control unit 305 determines whether or not recording of the motion picture of the subject imaged by the imaging unit 50 is finished (step S106). In a case where it is determined that the recording is finished, the process of the present embodiment is finished. In a case where the recording is not finished, a determination as to whether or not the shutter speed is changeable is performed again (step S101).

In the embodiment, a hardware structure of processing units such as the system control unit 25 and the image processing unit 31 executing various processes corresponds to various processors illustrated below. The various processors include a central processing unit (CPU) that is a general-purpose processor functioning as various processing units by executing software (program), a programmable logic device (PLD) such as a field programmable gate array (FPGA) that is a processor of which a circuit configuration can be changed after manufacturing, a dedicated electric circuit such as an application specific integrated circuit (ASIC) that is a processor having a circuit configuration dedicatedly designed to execute a specific process, and the like.

One processing unit may be configured with one of the various processors or may be configured with two or more processors of the same type or different types (for example, a plurality of FPGAs or a combination of a CPU and an FPGA). In addition, a plurality of processing units may be configured with one processor. As an example of configuring a plurality of processing units with one processor, a first form is configuring one processor with a combination of one or more CPUs and software and implementing functions of a plurality of processing units by the processor as represented by a computer such as a client and a server. A second form is using a processor that implements the function of the whole system including a plurality of processing units by one integrated circuit (IC) chip as represented by a system on chip (SoC) and the like. Various processing units are configured using one or more of the various processors as a hardware structure.

Furthermore, the hardware structure of the various processors is more specifically an electric circuit (circuitry) in which circuit elements such as semiconductor elements are combined.

Each configuration and each function described above can be appropriately implemented by any hardware, software, or a combination of both hardware and software. For example, the present invention can also be applied to a program that causes a computer to execute the process steps (process procedure) described above, a computer-readable recording medium (non-transitory recording medium) on which the program is recorded, or a computer on which the program can be installed.

Second Embodiment

Next, the digital camera 2 that is a second embodiment of the present invention will be described.

Figure 10:
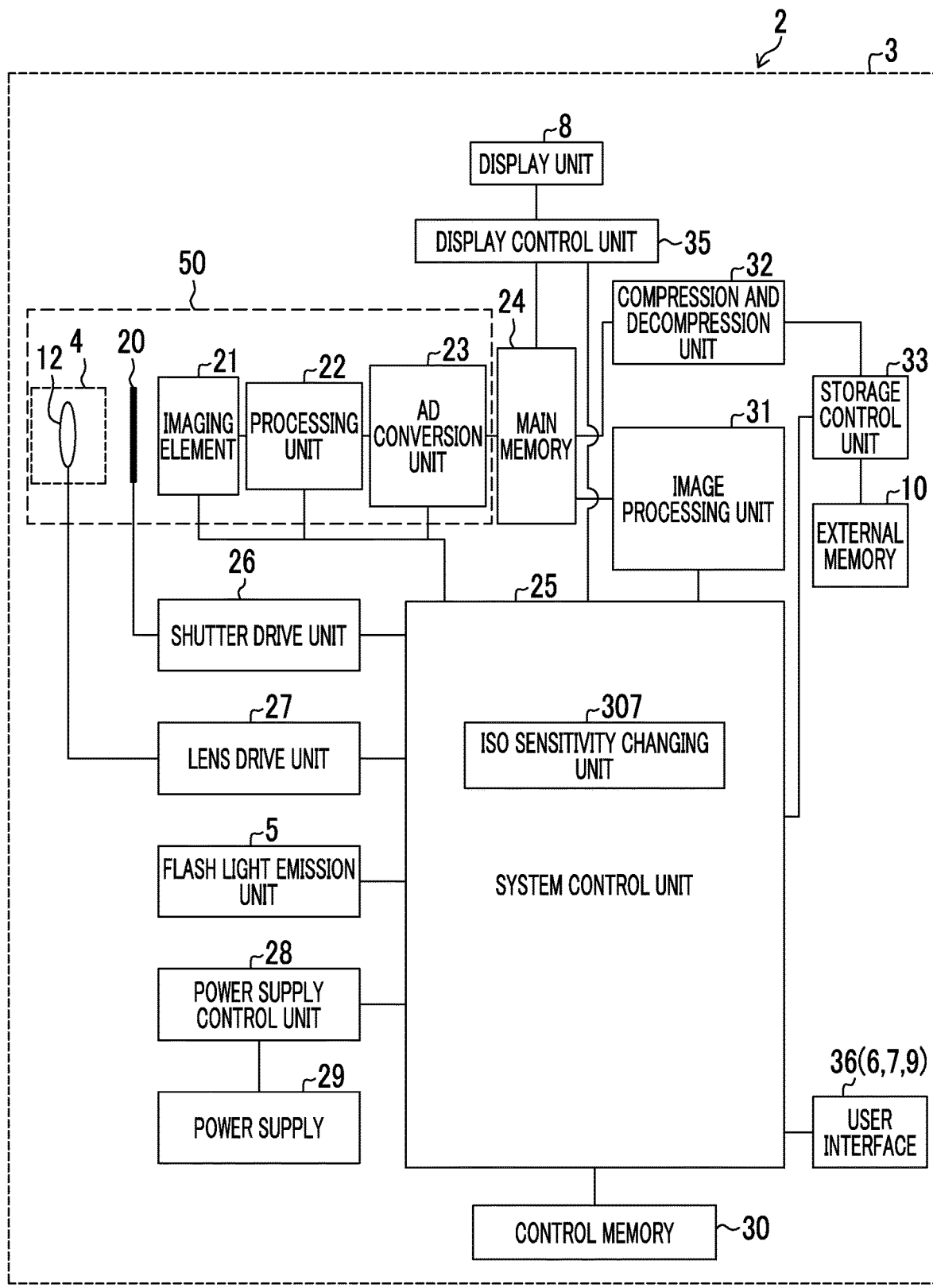
FIG. 10 is a block diagram illustrating the control processing system of the digital camera.

FIG. 10 is a block diagram illustrating the control processing system of the digital camera 2 of the present embodiment. Points already described in FIG. 3 will be designated by the same reference signs, and descriptions of such points will not be repeated.

In the digital camera 2 of the present embodiment, an ISO sensitivity changing unit 307 is comprised in the system control unit 25.

The ISO sensitivity changing unit 307 changes the ISO sensitivity of the captured image captured by the imaging unit 50. That is, the ISO sensitivity changing unit 307 changes the ISO sensitivity of the image acquired by the imaging unit 50 by controlling the imaging element 21, the processing unit 22, and/or the AD conversion unit 23.

In the adjustment of the exposure amount for the dynamic range expansion process, a method of changing the sensitivity is considered besides the change of the exposure time. In a case where the sensitivity is changed, a range of an applicable shutter speed is limited compared to the range in a case of changing the exposure amount using the shutter speed, because an image having a large exposure amount and an image having a small exposure amount have the same shutter speed. Meanwhile, a sensitivity setting of the HDR image is decreased by half (in a case where an expansion amount of the dynamic range is 1 EV). Thus, a noise amount is also decreased by half, and image quality is improved compared to the image quality in the shutter speed type M-HDR (SS) process.

Accordingly, in a range there is a margin for the shutter speed, the M-HDR (sensitivity) process in which the exposure amount is adjusted using the sensitivity is used. In a region that cannot be handled using the sensitivity, the M-HDR (SS) process that is adjusted using the shutter speed is used. In a region that cannot be handled even using the shutter speed, the S-HDR process is used.

Specifically, the control unit 305 acquires the time of one frame period in a case where imaging is performed by decreasing the sensitivity by the ISO sensitivity changing unit 307. The control unit 305 causes the first dynamic range expansion processing unit 301 or the second dynamic range expansion processing unit 303 to execute the dynamic range expansion process based on the time of one frame period and the total exposure time including the exposure time in a case where a plurality of captured images are captured in the first dynamic range expansion processing unit 301 and imaging is performed by decreasing the sensitivity by the ISO sensitivity changing unit 307.

For example, the control unit 305 may cause the first dynamic range expansion processing unit 301 or the second dynamic range expansion processing unit 303 to execute the dynamic range expansion process based on a comparison result between the time of one frame period and the total exposure time including the exposure time in a case where a plurality of captured images are captured in the first dynamic range expansion processing unit 301 and imaging is performed by decreasing the ISO sensitivity by the ISO sensitivity changing unit 307. As a specific example, the control unit 305 may compare magnitudes of the time of one frame period and the total exposure time. In a case where the time of one frame period is longer (larger), the control unit 305 may cause the first dynamic range expansion processing unit 301 to perform the dynamic range expansion process. In a case where the time of one frame period is shorter (smaller), the control unit 305 may cause the second dynamic range expansion processing unit 303 to perform the dynamic range expansion process.

In addition, for example, in a case where the time of one frame period is longer than or equal to the total exposure time including the exposure time in a case where imaging is performed by decreasing the sensitivity by the ISO sensitivity changing unit 307, the control unit 305 captures at least one of the plurality of captured images of the first dynamic range expansion processing unit 301 by changing the ISO sensitivity by the ISO sensitivity changing unit 307.

FIG. 11 is a diagram illustrating a relationship between the exposure time and the ISO sensitivity in the M-HDR (sensitivity) process, the M-HDR (SS) process, and the S-HDR process. The example illustrated in FIG. 11 is a case where the frame rate is 30 fps and the ISO sensitivity is set to ISO3200.

For example, in a case of the M-HDR (sensitivity) process, the normal image and the HDR image are captured at the same shutter speed of 16 ms, and the sensitivity is changed to ISO3200 as the sensitivity of the normal image and to ISO1600 as the sensitivity of the HDR image. Accordingly, the imaging unit 50 captures two captured images having different exposure conditions.

In addition, in a case of the M-HDR (SS) process, the sensitivity of the normal image and the sensitivity of the HDR image are equally set to ISO3200, and the shutter speeds of the exposure time of the normal image and the exposure time of the HDR image are set to 22 ms and 11 ms, respectively.

In addition, in a case of the S-HDR process, the imaging unit 50 acquires one captured image in an exposure time of 33 ms using the ISO sensitivity 3200 or the ISO sensitivity 1600.

Figure 12:
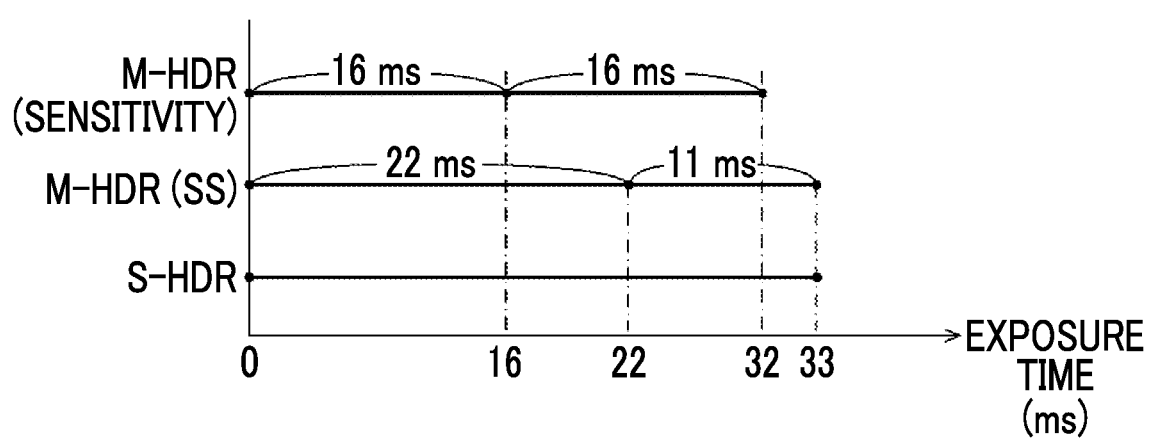
FIG. 12 is a diagram illustrating a relationship between the time of one frame period and a total exposure time.

FIG. 12 is a diagram illustrating a relationship between the time of one frame period and the total exposure time in imaging under the condition illustrated in FIG. 11. In the case of the M-HDR (sensitivity) process, imaging is performed twice using an exposure time of 16 ms, and the total exposure time is 32 ms. In the case of the M-HDR (SS) process, imaging having an exposure time of 22 ms is performed, and imaging having an exposure time of 11 ms is performed. Thus, the total exposure time is 33 ms. In the case of the S-HDR process, imaging having an exposure time of 33 ms is performed once.

In the M-HDR (sensitivity) process and the M-HDR (SS) process, in a case where the total exposure time is shorter than or equal to the time of one frame period, the M-HDR (sensitivity) process is performed in a case where the ISO sensitivity can be changed. In a case where there is no margin for the exposure time in the relationship between the total exposure time and the time of one frame period, the M-HDR (SS) process is performed. In a case where that cannot be handled by the M-HDR (SS) process (in a case where the exposure time is long), the S-HDR process is performed.

Figure 13:
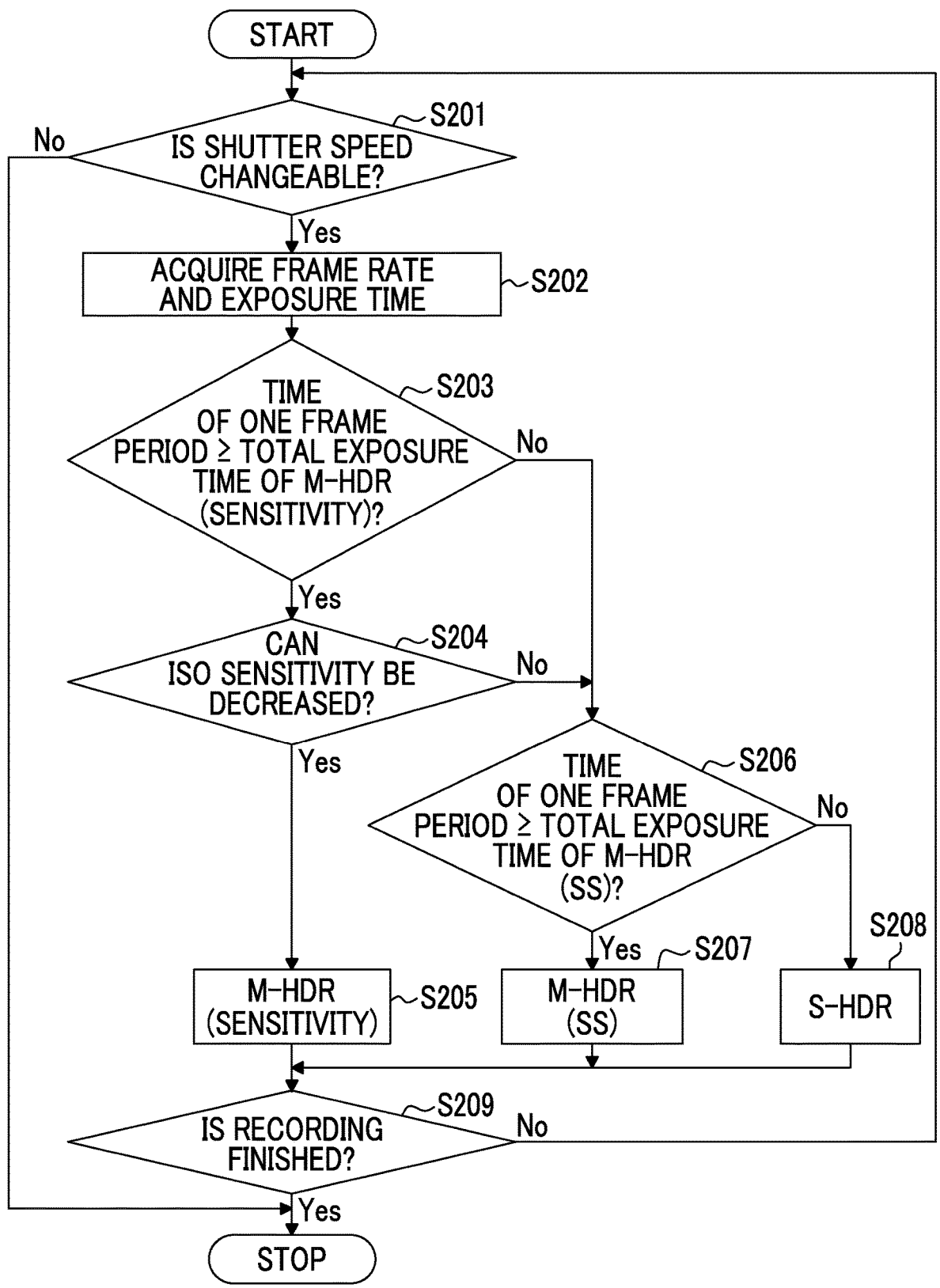
FIG. 13 is a flowchart illustrating an operation of the digital camera.

Next, an imaging step of the present embodiment will be described. FIG. 13 is a flowchart illustrating an operation of the digital camera 2.

First, in the digital camera 2, the control unit 305 determines whether or not the shutter speed can be changed (step S201). In a case where the user sets the shutter speed not to be changeable, the process of the present embodiment is stopped by the control unit 305 because a case that accompanies a change of the speed of the shutter speed occurs.

In a case where the shutter speed is changeable, the process of the present embodiment is executed. The control unit 305 acquires the frame rate set in the digital camera 2 and the exposure time conforming with the scene to be imaged (step S202). Then, the control unit 305 determines whether or not the time of one frame period is longer than the total exposure time of the M-HDR (sensitivity) process (step S203). In a case where it is determined that the time of one frame period is longer than or equal to the total exposure time of the M-HDR (sensitivity) process, the control unit 305 determines whether or not the ISO sensitivity can be decreased (step S204).

In a case where the ISO sensitivity can be decreased, the control unit 305 executes the M-HDR (sensitivity) process on the captured image by the first dynamic range expansion processing unit 301 (step S205).

In a case where the ISO sensitivity cannot be decreased, the control unit 305 determines whether or not the total exposure time of the M-HDR (SS) process is shorter than the time of one frame period (step S206). In a case where the time of one frame period is longer than or equal to the total exposure time of the M-HDR (SS) process, the control unit 305 performs the M-HDR (SS) process (step S207). In a case where the time of one frame period is shorter than the total exposure time of the M-HDR process, the control unit 305 performs the S-HDR process (step S208).

Then, the control unit 305 determines whether or not the recording of the motion picture of the subject imaged by the imaging unit 50 is finished (step S209). In a case where it is determined that the recording is finished, the process of the present embodiment is finished. In a case where the recording is not finished, a determination as to whether or not the shutter speed is changeable is performed again (step S201).

Next, another example of the imaging step of the present embodiment will be described. In the present example, the M-HDR (sensitivity) process and the S-HDR process are switched. That is, in a case where the M-HDR (sensitivity) process is not performed by the first dynamic range expansion processing unit 301, the control unit 305 causes the second dynamic range expansion processing unit 303 to perform the S-HDR process.

Figure 14:
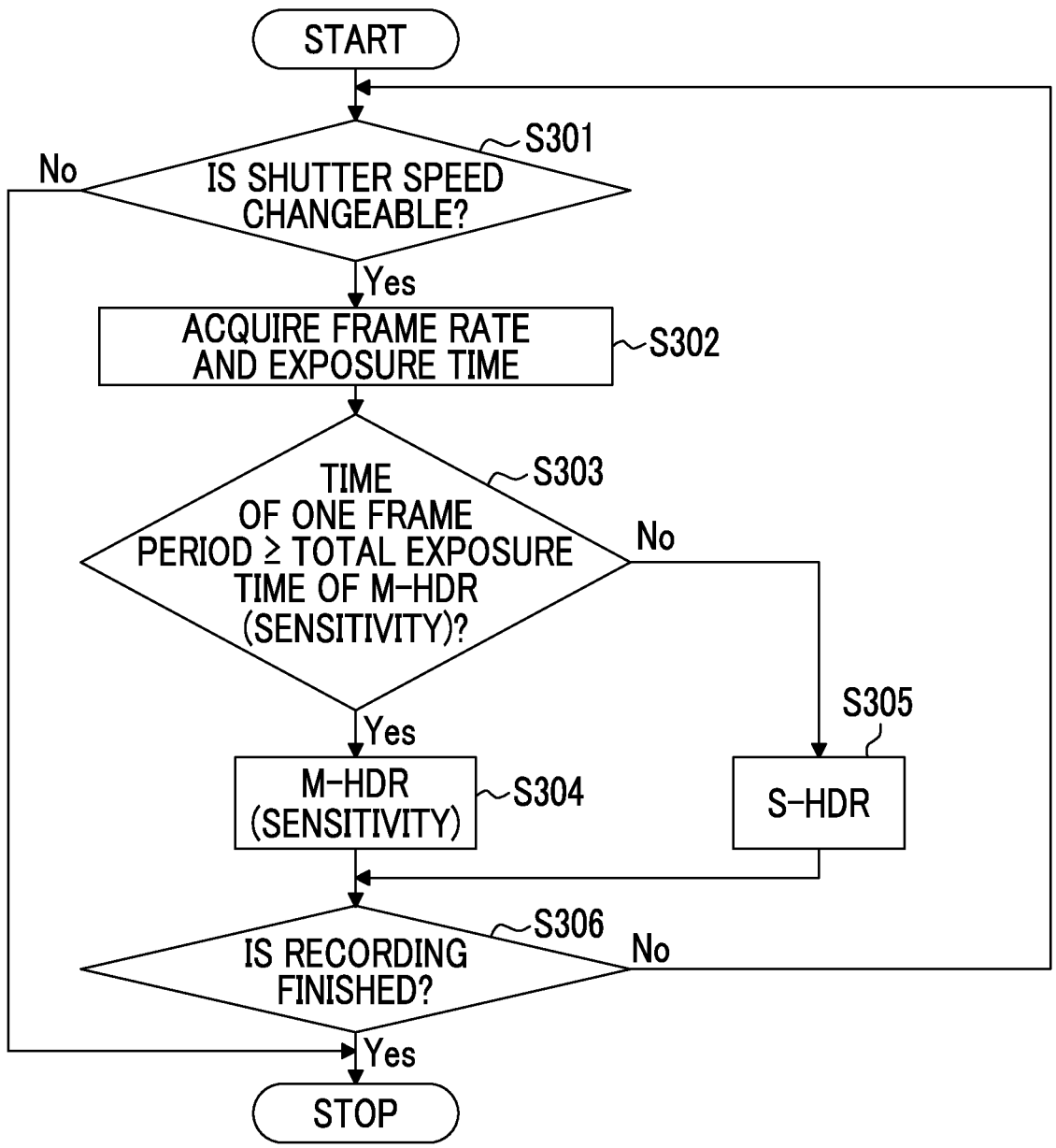
FIG. 14 is a flowchart illustrating an operation of the digital camera.

FIG. 14 is a flowchart illustrating an operation of the digital camera 2 of the present example.

First, in the digital camera 2, the control unit 305 determines whether or not the shutter speed can be changed (step S301).

In a case where the shutter speed is changeable, the process of the present example is executed. The control unit 305 acquires the frame rate set in the digital camera 2 and the exposure time conforming with the scene to be imaged (step S302). Then, the control unit 305 determines whether or not the time of one frame period is longer than the total exposure time of the M-HDR (sensitivity) process (step S303). In a case where it is determined that the time of one frame period is longer than or equal to the total exposure time of the M-HDR (sensitivity) process, the control unit 305 executes the M-HDR (sensitivity) process on the captured image by the first dynamic range expansion processing unit 301 (step S304).

In a case where it is determined that the time of one frame period is shorter than the total exposure time of the M-HDR (sensitivity) process, the control unit 305 executes the S-HDR process on the captured image by the second dynamic range expansion processing unit 303 (step S305).

Then, the control unit 305 determines whether or not the recording of the motion picture of the subject imaged by the imaging unit 50 is finished (step S306). In a case where it is determined that the recording is finished, the process of the present example is finished. In a case where the recording is not finished, a determination as to whether or not the shutter speed is changeable is performed again (step S301).

Third Embodiment

Figure 15:
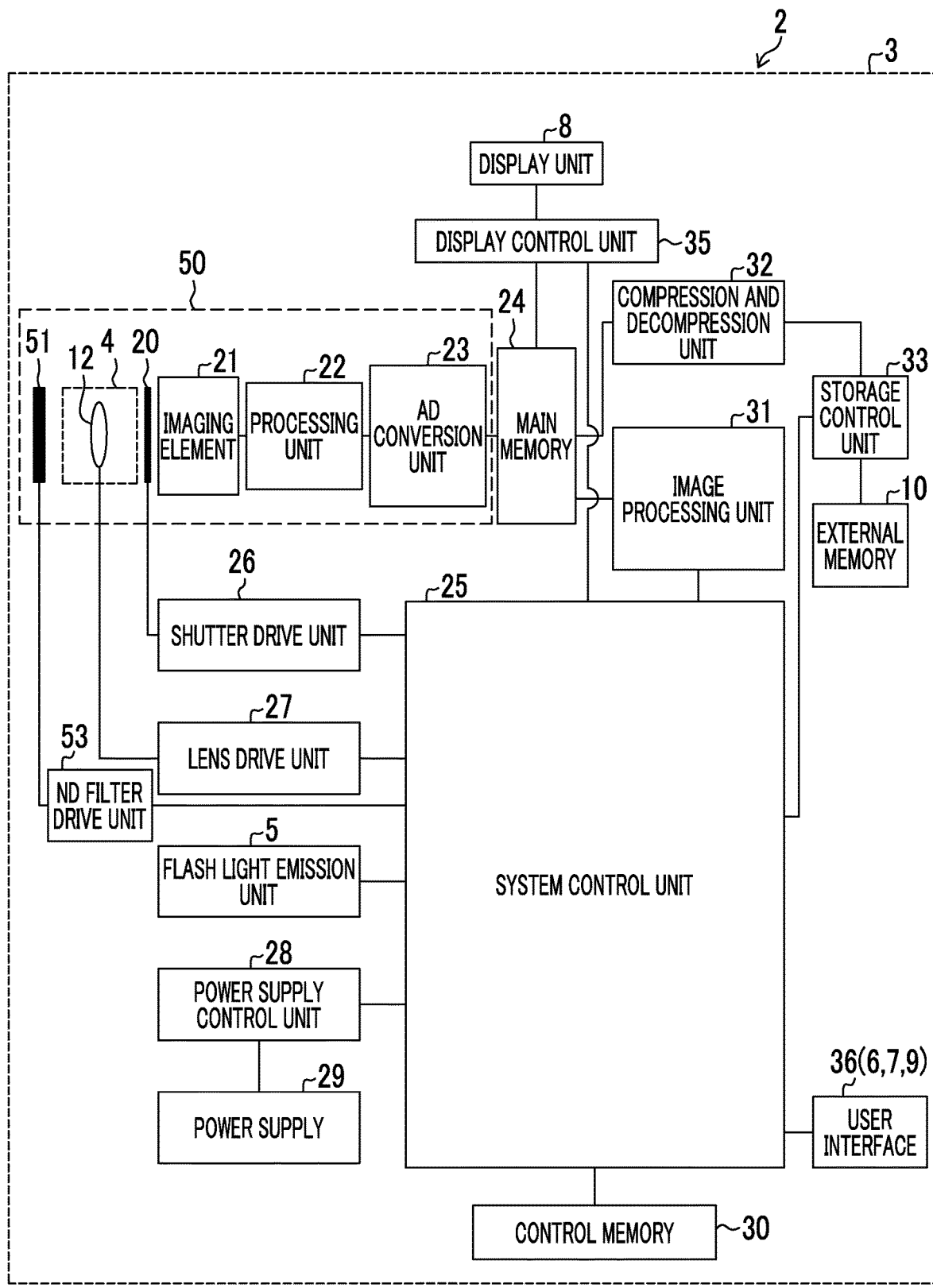
FIG. 15 is a block diagram illustrating the control processing system of the digital camera.

Next, the digital camera 2 that is a third embodiment of the present invention will be described. FIG. 15 is a block diagram illustrating the control processing system of the digital camera 2 of the present embodiment.

An ND filter 51 as one example of light reduction means is disposed in the imaging unit 50. It is preferable that the ND filter 51 can be inserted and withdrawn with respect to the imaging unit 50. The ND filter 51 is inserted and withdrawn with respect to the imaging unit 50 by an ND filter drive unit 53. The ND filter drive unit 53 is controlled by the system control unit 25. As another example of the light reduction means, it is considered that an electrochromic element or the like of which transmittance can be electrically changed is used.

The first dynamic range expansion processing unit 301 or the second dynamic range expansion processing unit 303 of the present embodiment executes the dynamic range expansion process based on the captured image captured by the imaging unit 50 in which the ND filter 51 is disposed. That is, the first dynamic range expansion processing unit 301 generates the composite image from the captured image captured by the imaging unit 50 in which the ND filter 51 is disposed, and the captured image captured by the imaging unit 50 in which the ND filter 51 is not disposed.

A usage form of the ND filter 51 will be described. In a significantly bright scene, simply adjusting the exposure amount by changing the shutter speed (controlling the exposure time) of the digital camera 2 and controlling the ISO sensitivity causes a case where a plurality of captured images having a changed exposure condition cannot be acquired (refer to FIG. 16).

FIG. 16 is a diagram describing acquisition of a plurality of captured images having different exposure conditions. The case illustrated in FIG. 16 is a case where the digital camera 2 having the minimum ISO sensitivity is ISO100 and the highest shutter speed of $\frac{1}{8000}$ seconds is used.

In the case of performing the M-HDR (sensitivity) process, the normal image is captured in an exposure time of 0.125 ms and ISO sensitivity of ISO100 at the highest shutter speed. In a case where the HDR image is captured in the same exposure time, the ISO sensitivity has to be set to ISO50. However, the digital camera 2 has the lowest sensitivity of ISO100 and cannot be set to ISO50.

Therefore, the execution of the M-HDR (sensitivity) process is enabled by comprising the ND filter 51 in the digital camera 2 and inserting the ND filter 51 for only the HDR image in the M-HDR (sensitivity) process.

In the M-HDR (SS) process, the exposure time of the normal image is 0.125 ms at the highest shutter speed. Thus, the exposure time of the HDR image has to be set to 0.0625 ms. However, the highest shutter speed is $\frac{1}{8000}$. Accordingly, in a case where the normal image is captured in such an exposure condition, the M-HDR (SS) process cannot be executed.

While the S-HDR process can also be executed by inserting the ND filter 51, an overall light intensity is decreased, and a signal is reduced in the case of the S-HDR process. Thus, an S/N ratio is degraded. Accordingly, the M-HDR (sensitivity) process is advantageous from a viewpoint of reducing noise since an effect of the ND filter 51 is applied to only the HDR image.

Application Example 1

Next, Application Example 1 of the present invention will be described. In the present example, a switching point of the dynamic range expansion process is recorded.

Specifically, the control unit 305 records the switching point of the dynamic range expansion process between the M-HDR process performed by the first dynamic range expansion processing unit 301 and the S-HDR process performed by the second dynamic range expansion processing unit 303. For example, the control unit 305 records the switching point in a header of a file of the motion picture or a file different from the file of the motion picture.

In the case of using the S-HDR process that generates the corrected image from an image (HDR image) having a wide dynamic range and a small exposure amount by performing correction using the tone curve, the noise in the dark part becomes worse than the noise in the M-HDR process. The reason is that since a dark image is obtained, the noise amount does not change, but the signal intensity is decreased. Accordingly, noise quality is changed between the motion picture subjected to the M-HDR process and the motion picture subjected to the S-HDR process. Thus, in a case where the user performs a noise reduction process (noise reducing process) on the motion picture after imaging, the user may adjust the noise reduction process while checking image quality. However, by explicitly indicating the point at which the dynamic range expansion process is switched, the noise reduction process can be performed more accurately and quickly.

Therefore, by outputting information of a change of a processing method between the M-HDR process and the S-HDR process to a header region of the motion picture file or a different file, the user easily performs the noise reducing process or the like afterward.

In addition, a noise reduction function may be provided in the digital camera 2, and intensity of noise reduction may be automatically adjusted by the control unit 305 of the image processing unit 31 depending on an expansion amount of the dynamic range. For example, the intensity of noise reduction may be increased twice at 1 EV, and the intensity of noise reduction may be increased four times at 2 EV.

Furthermore, after an elapse of a predetermined time from first switching of the dynamic range expansion process between the first dynamic range expansion processing unit 301 and the second dynamic range expansion processing unit 303, the control unit 305 performs second switching of the dynamic range expansion process between the first dynamic range expansion processing unit 301 and the second dynamic range expansion processing unit 303. The first switching of the dynamic range expansion process is stopped during the predetermined time. Accordingly, the user is not disturbed by frequent switching of the noise amount. For example, the predetermined time is 10 seconds, 30 seconds, or 1 minute.

Application Example 2

Next, Application Example 2 of the present invention will be described. The first dynamic range expansion processing unit 301 of the present example generates the composite image using a plurality of captured images that are captured in different frames.

Figure 17:
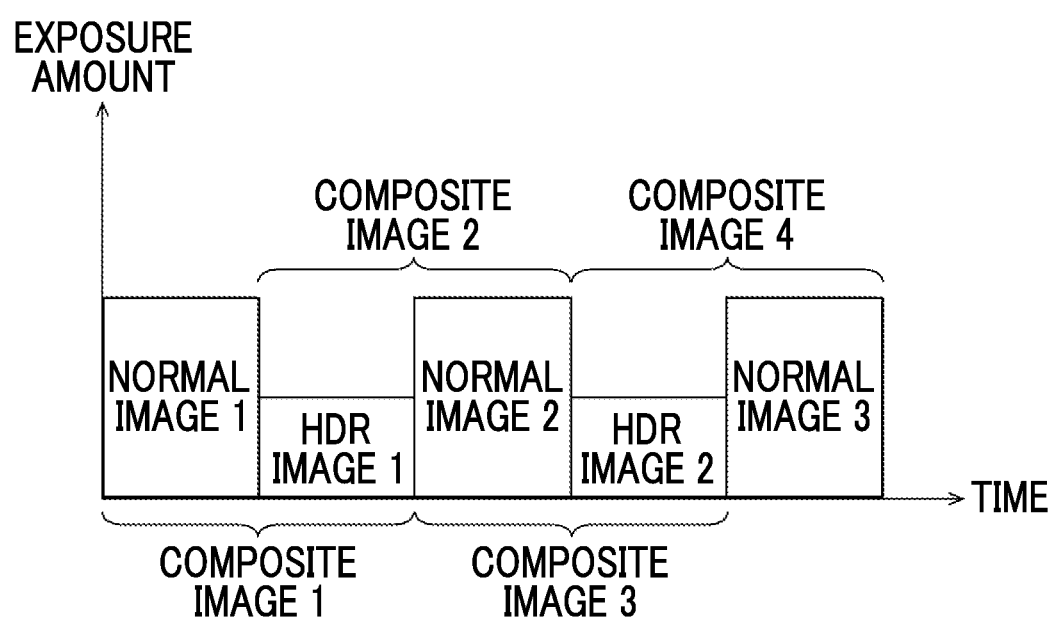
FIG. 17 is a diagram describing generation of the composite image.

FIG. 17 is a diagram describing generation of the composite image of the present example. In the case illustrated in FIG. 17, the normal image and the HDR image are sequentially captured in each frame such that a normal image 1 and an HDR image 1 are captured in a first frame, a normal image 2 and an HDR image 2 are captured in a second frame, and a normal image 3 and an HDR image 3 are captured in a third frame. The first dynamic range expansion processing unit 301 generates a composite image 1 using the normal image 1 and the HDR image 1, generates a composite image 2 using the HDR image 1 and the normal image 2, generates a composite image 3 using the normal image 2 and the HDR image 2, and generates a composite image 4 using the HDR image 2 and the normal image 3.

By generating the composite image in such a manner, a larger number of composite images can be generated, and the frame rate of the motion picture can be increased.

<Configuration of Smartphone>

Figure 18:
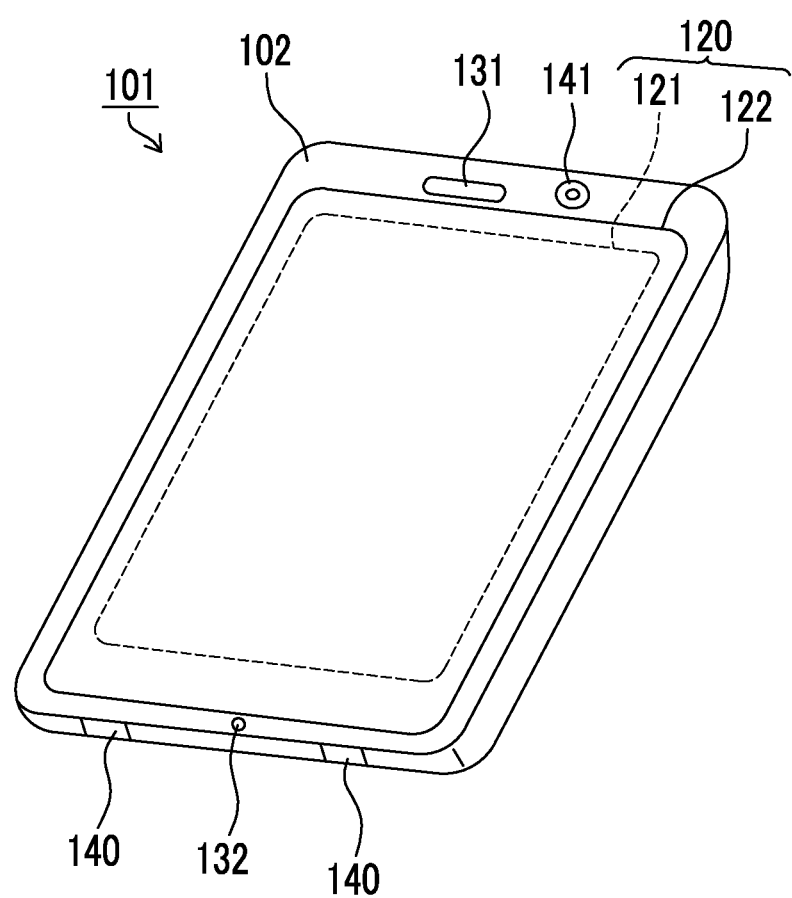
FIG. 18 is a diagram illustrating an exterior of a smartphone.

FIG. 18 is a diagram illustrating an exterior of a smartphone 101. The smartphone 101 illustrated in FIG. 18 includes a casing 102 having a flat plate shape and comprises a display and input unit 120 in which a display panel 121 as a display unit and an operation panel 122 as an input unit are integrated on one surface of the casing 102. In addition, the casing 102 comprises a speaker 131, a microphone 132, an operation unit 140, and a camera unit 141. The configuration of the casing 102 is not for limitation purposes. For example, a configuration in which the display unit and the input unit are independent may be employed, or a configuration having a folded structure or a sliding mechanism may be employed.

Figure 19:
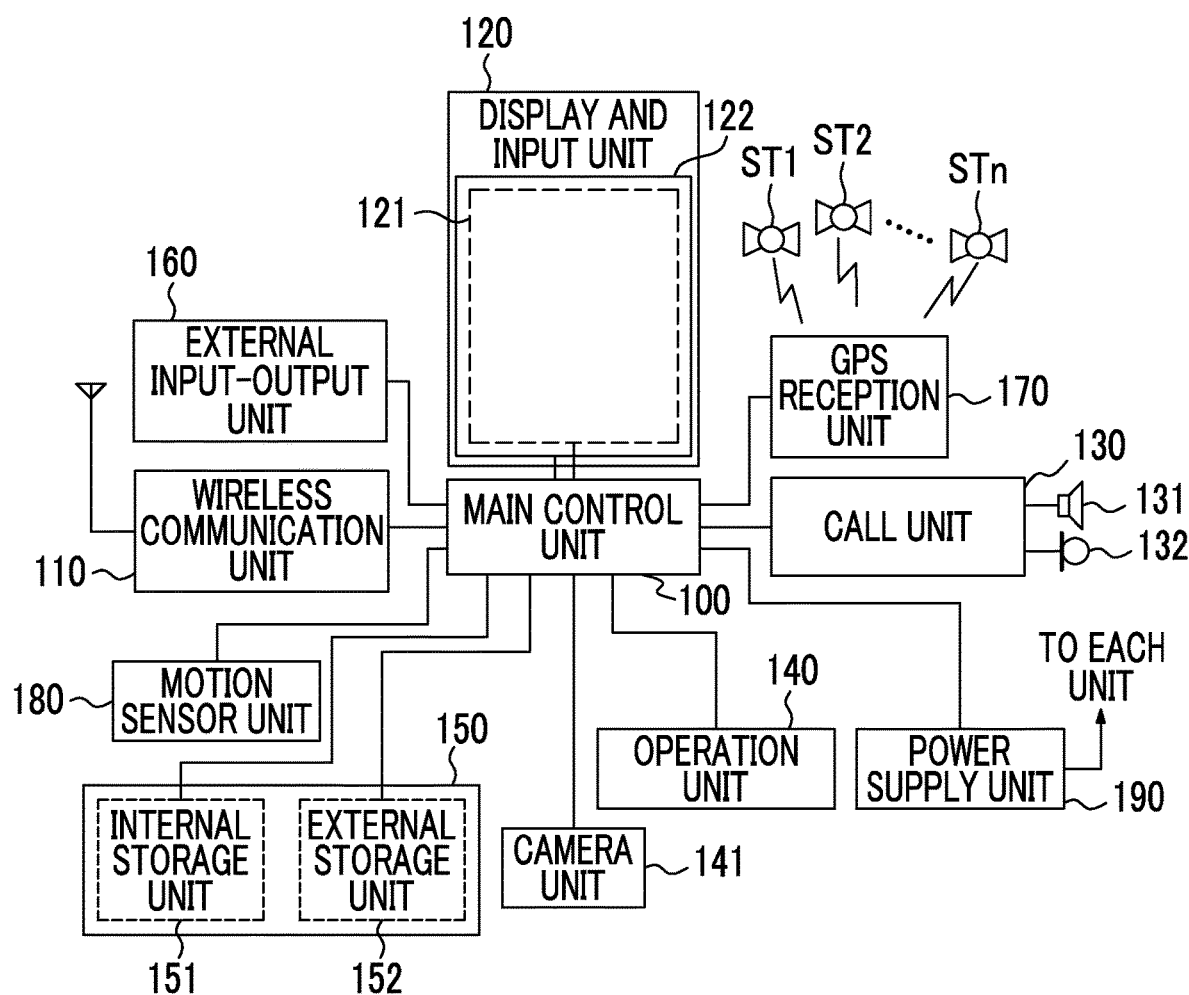
FIG. 19 is a block diagram illustrating a configuration of the smartphone.

FIG. 19 is a block diagram illustrating a configuration of the smartphone 101 illustrated in FIG. 18. As illustrated in FIG. 19, a wireless communication unit 110, the display and input unit 120, a call unit 130, the operation unit 140, the camera unit 141, a storage unit 150, an external input-output unit 160, a global positioning system (GPS) reception unit 170, a motion sensor unit 180, a power supply unit 190, and a main control unit 100 are comprised as main constituents of the smartphone. In addition, a wireless communication function of performing mobile wireless communication with a base station apparatus through a mobile communication network is provided as a main function of the smartphone 101.

The wireless communication unit 110 performs wireless communication with the base station apparatus accommodated in the mobile communication network in accordance with an instruction from the main control unit 100. Transmission and reception of various file data such as voice data and image data, electronic mail data, and the like and reception of Web data, streaming data, and the like are performed using the wireless communication.

The display and input unit 120 is a so-called touch panel that visually delivers information to the user by displaying images (still images and motion images), text information, and the like and detects a user operation with respect to the displayed information under control of the main control unit 100. The display and input unit 120 comprises the display panel 121 and the operation panel 122.

The display panel 121 uses a liquid crystal display (LCD), an organic electro-luminescence display (OELD), or the like as a display device. The operation panel 122 is a device that is placed such that an image displayed on a display surface of the display panel 121 can be visually perceived, and that detects coordinates operated by a finger of the user or a stylus. In a case where the device is operated by the finger of the user or the stylus, a detection signal generated by the operation is output to the main control unit 100. Next, the main control unit 100 detects an operation position (coordinates) on the display panel 121 based on the received detection signal.

As illustrated in FIG. 18, the display panel 121 and the operation panel 122 of the smartphone 101 illustrated as the digital camera 2 according to one embodiment of the present invention are integrated and constitute the display and input unit 120. The operation panel 122 is arranged to completely cover the display panel 121. In a case of employing such arrangement, the operation panel 122 may have a function of detecting the user operation even in a region outside the display panel 121. In other words, the operation panel 122 may comprise a detection region (hereinafter, referred to as a "display region") for a superimposition part overlapping with the display panel 121 and a detection region (hereinafter, referred to as a "non-display region") for a periphery part not overlapping with the display panel 121.

While a size of the display region and a size of the display panel 121 may completely match, it is not necessary to match both sizes. In addition, the operation panel 122 may comprise two sensitive regions of the periphery part and an inner part. Furthermore, a width of the periphery part is appropriately designed depending on a size and the like of the casing 102. Furthermore, as a position detection method employed by the operation panel 122, a matrix switch method, a resistive film method, a surface acoustic wave method, an infrared method, an electromagnetic induction method, an electrostatic capacitive method, and the like are exemplified, and any of the methods can be employed.

The call unit 130 comprises the speaker 131 and the microphone 132. The call unit 130 converts voice of the user input through the microphone 132 into voice data processable in the main control unit 100 and outputs the voice data to the main control unit 100. The call unit 130 decodes voice data received by the wireless communication unit 110 or the external input-output unit 160 and outputs the decoded voice data from the speaker 131. In addition, as illustrated in FIG. 18, for example, the speaker 131 can be mounted on the same surface as the surface on which the display and input unit 120 is disposed, and the microphone 132 can be mounted on a side surface of the casing 102.

The operation unit 140 is a hardware key using a key switch or the like and receives an instruction from the user. For example, as illustrated in FIG. 18, the operation unit 140 is a push-button type switch that is mounted on a side surface of the casing 102 of the smartphone 101 and is switched ON in a case where the operation unit 140 is pushed with the finger or the like, and is switched OFF by restoring force of a spring or the like in a case where the finger is released.

The storage unit 150 stores a control program and control data of the main control unit 100, application software, address data in which a name, a telephone number, and the like of a communication counterpart are associated, data of transmitted and received electronic mails, Web data downloaded by Web browsing, and downloaded contents data, and temporarily stores streaming data and the like. In addition, the storage unit 150 is configured with an internal storage unit 151 incorporated in the smartphone and an external storage unit 152 that includes a slot for an attachable and detachable external memory. The each of the internal storage unit 151 and the external storage unit 152 constituting the storage unit 150 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 160 is an interface with all external apparatuses connected to the smartphone 101 and is directly or indirectly connected to other external apparatuses by communication or the like (for example, universal serial bus (USB) or IEEE1394) or through a network (for example, the Internet, a wireless LAN, Bluetooth (registered trademark), radio frequency identification (RFID), infrared communication (Infrared Data Association (IrDA)) (registered trademark) Ultra Wideband (UWB) (registered trademark), or ZigBee (registered trademark)).

For example, the external apparatuses connected to the smartphone 101 include a wired/wireless headset, a wired/wireless external charger, a wired/wireless data port, a memory card or a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, a PDA connected in a wired/wireless manner, and an earphone connected in a wired/wireless manner. The external input-output unit 160 may deliver data transmitted from the external apparatuses to each constituent inside the smartphone 101 or transmit data inside the smartphone 101 to the external apparatuses.

The GPS reception unit 170 receives GPS signals transmitted from GPS satellites ST1 to STn, executes a position measurement calculation process based on the plurality of received GPS signals, and detects a position including a latitude, a longitude, and an altitude of the smartphone 101 in accordance with an instruction from the main control unit 100. In a case where positional information can be acquired from the wireless communication unit 110 or the external input-output unit 160 (for example, wireless LAN), the GPS reception unit 170 can detect the position using the positional information.

For example, the motion sensor unit 180 comprises a three-axis acceleration sensor and detects a physical motion of the smartphone 101 in accordance with an instruction from the main control unit 100. By detecting the physical motion of the smartphone 101, a movement direction and an acceleration of the smartphone 101 are detected. A detection result is output to the main control unit 100.

The power supply unit 190 supplies power accumulated in a battery (not illustrated) to each unit of the smartphone 101 in accordance with an instruction from the main control unit 100.

The main control unit 100 comprises a microprocessor, operates in accordance with the control program and the control data stored in the storage unit 150, and controls each unit of the smartphone 101. In addition, the main control unit 100 has a mobile communication control function of controlling each unit of a communication system and an application processing function in order to perform voice communication and data communication through the wireless communication unit 110.

The application processing function is implemented by operating the main control unit 100 in accordance with the application software stored in the storage unit 150. For example, the application processing function is an infrared communication function of performing data communication with an opposing apparatus by controlling the external input-output unit 160, an electronic mail function of transmitting and receiving electronic mails, or a Web browsing function of browsing a Web page.

In addition, the main control unit 100 has an image processing function of, for example, displaying a video on the display and input unit 120 based on image data (data of a still image or a motion image) such as received data or downloaded streaming data. The image processing function is a function of decoding the image data, performing image processing on a decoding result, and displaying an image on the display and input unit 120 by the main control unit 100.

Furthermore, the main control unit 100 executes display control on the display panel 121 and operation detection control for detecting the user operation performed through the operation unit 140 and the operation panel 122.

By executing the display control, the main control unit 100 displays a software key such as an icon for starting the application software and a scroll bar, or displays a window for creating an electronic mail. The scroll bar is a software key for receiving an instruction to move a display part of the image for a large image or the like that does not fit in the display region of the display panel 121.

In addition, by executing the operation detection control, the main control unit 100 detects the user operation performed through the operation unit 140, receives an operation performed on the icon or an input of a text string in an input field of the window through the operation panel 122, or receives a scrolling request for a display image through the scroll bar.

Furthermore, by executing the operation detection control, the main control unit 100 has a touch panel control function of determining whether the operation position on the operation panel 122 is the superimposition part (display region) overlapping with the display panel 121 or the periphery part (non-display region) not overlapping with the display panel 121 and controlling the sensitive regions of the operation panel 122 and a display position of the software key.

In addition, the main control unit 100 may detect a gesture operation performed on the operation panel 122 and execute a preset function depending on the detected gesture operation. The gesture operation is not a simple touch operation in the related art and means an operation of drawing a trajectory by the finger or the like, designating a plurality of positions at the same time, or a combination thereof by drawing a trajectory from at least one of the plurality of positions.

The camera unit 141 is the digital camera 2 that performs electronic imaging using an imaging element such as a CMOS. In addition, the camera unit 141 can convert image data obtained by imaging into compressed image data of JPEG or the like, store the image data in the storage unit 150, and output the image data through the external input-output unit 160 or the wireless communication unit 110 under control of the main control unit 100. As illustrated in FIG. 18, in the smartphone 101, the camera unit 141 is mounted on the same surface as the display and input unit 120. However, the mounting position of the camera unit 141 is not for limitation purposes. The camera unit 141 may be mounted on a rear surface of the display and input unit 120, or a plurality of camera units 141 may be mounted. In a case where the plurality of camera units 141 are mounted, imaging may be performed by a single camera unit 141 by switching the camera unit 141 to be used in the imaging, or imaging may be performed using the plurality of camera units 141 at the same time.

In addition, the camera unit 141 can be used in various functions of the smartphone 101. For example, the image acquired by the camera unit 141 can be displayed on the display panel 121, and the image of the camera unit 141 can be used as one of operation inputs of the operation panel 122. In addition, in a case where the GPS reception unit 170 detects the position, the position can be detected with reference to the image from the camera unit 141. Furthermore, with reference to the image from the camera unit 141, a determination of an optical axis direction of the camera unit 141 of the smartphone 101 and a determination of the current usage environment can be performed without using the three-axis acceleration sensor or along with the three-axis acceleration sensor. The image from the camera unit 141 can also be used in the application software.

Besides, the positional information acquired by the GPS reception unit 170, voice information (may be subjected to voice to text conversion and be obtained as text information by the main control unit or the like) acquired by the microphone 132, attitude information acquired by the motion sensor unit 180, and the like can be added to the image data of the still picture or the motion picture, and the image data can be stored in the storage unit 150 and be output through the external input-output unit 160 or the wireless communication unit 110.

For example, the image processing unit 31 and the system control unit 25 can be implemented by the main control unit 100.

An imaging apparatus that is one aspect of the present invention comprises an imaging unit that images a motion picture of a subject, a first dynamic range expansion processing unit that performs a dynamic range expansion process by causing the imaging unit to capture a plurality of captured images having different exposure conditions in correspondence with a frame rate of the motion picture and generating one composite image from the plurality of captured images, a second dynamic range expansion processing unit that performs the dynamic range expansion process by causing the imaging unit to capture one captured image in correspondence with the frame rate of the motion picture and correcting an output value of a signal of the one captured image, and a control unit that causes the first dynamic range expansion processing unit or the second dynamic range expansion processing unit to execute the dynamic range expansion process based on a time of one frame period of the frame rate and a total exposure time in a case of capturing the plurality of captured images in the first dynamic range expansion processing unit.

According to the present aspect, the imaging apparatus includes the first dynamic range expansion processing unit that performs the dynamic range expansion process by causing the imaging unit to capture the plurality of captured images having different exposure conditions in correspondence with the frame rate of the motion picture and generating one composite image from the plurality of captured images, and the second dynamic range expansion processing unit that performs the dynamic range expansion process by causing the imaging unit to capture one captured image in correspondence with the frame rate of the motion picture and correcting the output value of the signal of the one captured image. Accordingly, in the present aspect, by separately using the first dynamic range expansion processing unit and the second dynamic range expansion processing unit, an appropriate dynamic range expansion process corresponding to a dark scene or a bright scene can be performed with reduction in blurriness of the subject. In addition, the control unit controls the dynamic range expansion process performed by the first dynamic range expansion processing unit or the second dynamic range expansion processing unit based on the time of one frame period of the frame rate and the total exposure time in a case of capturing the plurality of captured images in the first dynamic range expansion processing unit. Accordingly, in the present aspect, an appropriate dynamic range expansion process can be performed while the set frame rate is maintained.

It is preferable that the first dynamic range expansion processing unit changes the exposure condition by changing the exposure time.

According to the present aspect, the dynamic range expansion process is performed based on the plurality of captured images captured by changing the exposure time. Thus, the dynamic range expansion process is performed using the plurality of captured images having the same noise quality, and the composite image of high image quality can be obtained.

It is preferable that the control unit causes the first dynamic range expansion processing unit or the second dynamic range expansion processing unit to execute the dynamic range expansion process based on a comparison result between the time of one frame period and the total exposure time in a case of capturing the plurality of captured images in the first dynamic range expansion processing unit.

According to the present aspect, the execution of the dynamic range expansion process is controlled based on the comparison result between the time of one frame period and the total exposure time in a case of capturing the plurality of captured images in the first dynamic range expansion processing unit. Accordingly, in the present aspect, an appropriate dynamic range expansion process can be performed.

It is preferable that the control unit causes the first dynamic range expansion processing unit to execute the dynamic range expansion process in a case where the time of one frame period is longer than or equal to the total exposure time in a case of capturing the plurality of captured images in the first dynamic range expansion processing unit, and causes the second dynamic range expansion processing unit to execute the dynamic range expansion process in a case where the time of one frame period is shorter than the total exposure time in a case of capturing the plurality of captured images in the first dynamic range expansion processing unit.

According to the present aspect, in a case where the time of one frame period is longer than or equal to the total exposure time in a case of capturing the plurality of captured images in the first dynamic range expansion processing unit, the first dynamic range expansion processing unit performs the dynamic range expansion process. Accordingly, in the present aspect, the captured image of high image quality on which an appropriate dynamic range expansion process is performed can be obtained. Meanwhile, according to the present aspect, in a case where the time of one frame period is shorter the total exposure time in a case of capturing the plurality of captured images in the first dynamic range expansion processing unit, the second dynamic range expansion processing unit performs the dynamic range expansion process. Accordingly, in the present aspect, the captured image on which the dynamic range expansion process is performed by reducing blurriness of the subject and maintaining the set frame rate can be obtained.

It is preferable that the first dynamic range expansion processing unit causes the imaging unit to capture a first captured image and a second captured image having a shorter exposure time than the first captured image and generates the composite image from the first captured image and the second captured image.

According to the present aspect, the first dynamic range expansion processing unit causes the imaging unit to capture the first captured image and the second captured image having a shorter exposure time than the first captured image and generates the composite image from the first captured image and the second captured image. Accordingly, in the present aspect, by compositing a dark part of the first captured image having a long exposure time and a bright part of the second captured image having a short exposure time, the composite image on which the dynamic range expansion process is performed can be obtained, and the obtained composite image has a large number of gradations in the dark part and the bright part.

It is preferable that the first dynamic range expansion processing unit causes the imaging unit to capture a first captured image, a second captured image having a shorter exposure time than the first captured image, and a third captured image having a shorter exposure time than the second captured image and generates the composite image from the first captured image, the second captured image, and the third captured image.

According to the present aspect, the first dynamic range expansion processing unit causes the imaging unit to capture the first captured image, the second captured image having a shorter exposure time than the first captured image, and the third captured image having a shorter exposure time than the second captured image and generates the composite image from the first captured image, the second captured image, and the third captured image. Accordingly, in the present aspect, by compositing the dark part of the first captured image having a long exposure time, an intermediate part of the second captured image having an intermediate exposure time, and a bright part of the third captured image having a short exposure time, the composite image on which the dynamic range expansion process is performed can be obtained, and the obtained composite image has a large number of gradations in the dark part, the intermediate part, and the bright part.

It is preferable that the first dynamic range expansion processing unit changes the exposure condition by changing ISO sensitivity.

According to the present aspect, the first dynamic range expansion processing unit performs the dynamic range expansion process based on the plurality of captured images captured by changing the ISO sensitivity. Accordingly, in the present aspect, the captured image having decreased ISO sensitivity is used in the dynamic range expansion process, and an image of high image quality in which noise is reduced can be obtained.

It is preferable that the imaging apparatus further comprises an ISO sensitivity changing unit that changes ISO sensitivity of the captured image captured by the imaging unit, in which the control unit causes the first dynamic range expansion processing unit or the second dynamic range expansion processing unit to execute the dynamic range expansion process based on the time of one frame period and the total exposure time in a case of capturing the plurality of captured images in the first dynamic range expansion processing unit, the total exposure time including the exposure time in a case of capturing the plurality of captured images by decreasing the ISO sensitivity by the ISO sensitivity changing unit.

According to the present aspect, the dynamic range expansion process is controlled based on the time of one frame period and the total exposure time in a case of capturing the plurality of captured images in the first dynamic range expansion processing unit. The total exposure includes the exposure time in a case of capturing the plurality of captured images by decreasing the ISO sensitivity by the ISO sensitivity changing unit. Accordingly, in the present aspect, even in a case where the ISO sensitivity is changed, an appropriate dynamic range expansion process in which the frame rate is maintained can be performed.

It is preferable that the imaging apparatus further comprises an ISO sensitivity changing unit that changes ISO sensitivity of the captured image captured by the imaging unit, in which the control unit causes the first dynamic range expansion processing unit or the second dynamic range expansion processing unit to execute the dynamic range expansion process based on a comparison result between the time of one frame period and the total exposure time in a case of capturing the plurality of captured images in the first dynamic range expansion processing unit, the total exposure time including the exposure time in a case of capturing the plurality of captured images by decreasing the ISO sensitivity by the ISO sensitivity changing unit.

According to the present aspect, the execution of the dynamic range expansion process is controlled based on the comparison result between the time of one frame period and the total exposure time in a case of capturing the plurality of captured images in the first dynamic range expansion processing unit. The total exposure time includes the exposure time in a case of capturing the plurality of captured images by decreasing the ISO sensitivity by the ISO sensitivity changing unit. Accordingly, in the present aspect, an appropriate dynamic range expansion process can be performed.

It is preferable that in a case where the time of one frame period is longer than or equal to the total exposure time including the exposure time in a case of capturing the plurality of captured images by decreasing the ISO sensitivity by the ISO sensitivity changing unit, the control unit captures at least one captured image of the plurality of captured images of the first dynamic range expansion processing unit by changing the ISO sensitivity by the ISO sensitivity changing unit.

According to the present aspect, in a case where the time of one frame period is longer than or equal to the total exposure time including the exposure time in a case of capturing the plurality of captured images by decreasing the ISO sensitivity by the ISO sensitivity changing unit, at least one captured image of the plurality of captured images of the first dynamic range expansion processing unit is captured by changing the ISO sensitivity by the ISO sensitivity changing unit. Accordingly, in the present aspect, the captured image in which noise is reduced is acquired by capturing by decreasing the ISO sensitivity, and the dynamic range expansion process is executed based on the image. Thus, the composite image of high image quality can be obtained.

It is preferable that light reduction means is disposed in the imaging unit, and the first dynamic range expansion processing unit or the second dynamic range expansion processing unit executes the dynamic range expansion process based on the captured image captured by the imaging unit in which the light reduction means is disposed.

According to the present aspect, the first dynamic range expansion processing unit or the second dynamic range expansion processing unit executes the dynamic range expansion process based on the captured image captured by the imaging unit in which the light reduction means is disposed. Accordingly, in the present aspect, the dynamic range expansion process can be executed even in a bright scene exceeding the highest shutter speed and the lowest ISO sensitivity of the imaging apparatus.

It is preferable that the light reduction means is an ND filter.

It is preferable that the ND filter that is insertable and withdrawable is disposed in the imaging unit, and the first dynamic range expansion processing unit generates the composite image from the captured image captured by the imaging unit in which the ND filter is disposed, and the captured image captured by the imaging unit in which the ND filter is not disposed.

According to the present aspect, the composite image is generated from the captured image captured by the imaging unit in which the ND filter is disposed, and the captured image captured by the imaging unit in which the ND filter is not disposed. Accordingly, in the present aspect, the dynamic range expansion process can be executed even in a bright scene exceeding the highest shutter speed and the lowest ISO sensitivity of the imaging apparatus.

It is preferable that the control unit records a switching point of the dynamic range expansion process between the first dynamic range expansion processing unit and the second dynamic range expansion processing unit.

According to the present aspect, the control unit records the switching point of the dynamic range expansion process between the first dynamic range expansion processing unit and the second dynamic range expansion processing unit. Accordingly, in the present aspect, after the motion picture is imaged, the switching point of the dynamic range expansion process is accurately and quickly perceived. For example, in a case where the motion picture is edited after imaging, convenience is provided to the user by enabling accurate and quick recognition of the switching point of the dynamic range expansion process by recording the switching point.

It is preferable that the control unit records the switching point in a header of a file of the motion picture or a file different from the file of the motion picture.

According to the present aspect, the control unit records the switching point in the header of the file of the motion picture or the file different from the file of the motion picture. Thus, after the motion picture is imaged, the switching point of the dynamic range expansion process is accurately and quickly perceived.

It is preferable that after an elapse of a predetermined time from first switching of the dynamic range expansion process between the first dynamic range expansion processing unit and the second dynamic range expansion processing unit, the control unit performs second switching of the dynamic range expansion process between the first dynamic range expansion processing unit and the second dynamic range expansion processing unit.

According to the present aspect, in a case where the predetermined time does not elapse from the first switching of the dynamic range expansion process between the first dynamic range expansion processing unit and the second dynamic range expansion processing unit, the control unit does not perform the subsequent switching of the dynamic range expansion process. Accordingly, in the present aspect, an easily viewable motion picture can be generated by reducing frequency changes of noise quality accompanied by frequent switching of the dynamic range expansion process.

It is preferable that the first dynamic range expansion processing unit generates the composite image using the plurality of captured images captured in different frames.

According to the present aspect, the first dynamic range expansion processing unit generates the composite image using the plurality of captured images captured in different frames. Thus, a larger number of composite images can be obtained.

It is preferable that in imaging performed by the imaging unit, the control unit determines whether or not a shutter speed is changeable and causes the first dynamic range expansion processing unit or the second dynamic range expansion processing unit to execute the dynamic range expansion process in a case where the shutter speed is changeable.

According to the present aspect, the control unit determines whether or not the shutter speed is changeable and performs the dynamic range expansion process of the present invention in a case where the shutter speed is changeable. Accordingly, in the present aspect, the imaging of the motion picture on which the shutter speed intended by the user is reflected can be performed.

An imaging method that is another aspect of the present invention is an imaging method of an imaging apparatus including an imaging unit that images a motion picture of a subject, a first dynamic range expansion processing unit that performs a dynamic range expansion process by causing the imaging unit to capture a plurality of captured images having different exposure conditions in correspondence with a frame rate of the motion picture and generating one composite image from the plurality of captured images, and a second dynamic range expansion processing unit that performs the dynamic range expansion process by causing the imaging unit to capture one captured image in correspondence with the frame rate of the motion picture and correcting an output value of a signal of the one captured image. The method comprises a step of controlling execution of the dynamic range expansion process by the first dynamic range expansion processing unit or the second dynamic range expansion processing unit based on a time of one frame period of the frame rate and a total exposure time in a case of capturing the plurality of captured images in the first dynamic range expansion processing unit.

A program that is another aspect of the present invention is a program causing a computer to execute an imaging method of an imaging apparatus including an imaging unit that images a motion picture of a subject, a first dynamic range expansion processing unit that performs a dynamic range expansion process by causing the imaging unit to capture a plurality of captured images having different exposure conditions in correspondence with a frame rate of the motion picture and generating one composite image from the plurality of captured images, and a second dynamic range expansion processing unit that performs the dynamic range expansion process by causing the imaging unit to capture one captured image in correspondence with the frame rate of the motion picture and correcting an output value of a signal of the one captured image. The imaging method includes a step of controlling execution of the dynamic range expansion process by the first dynamic range expansion processing unit or the second dynamic range expansion processing unit based on a time of one frame period of the frame rate and a total exposure time in a case of capturing the plurality of captured images in the first dynamic range expansion processing unit.

An imaging apparatus disclosed in Appendix 1 below can be perceived from the above disclosure.

[Appendix 1] An imaging apparatus comprising an imaging unit that images a motion picture of a subject, a first dynamic range expansion processing processor that performs a dynamic range expansion process by causing the imaging unit to capture a plurality of captured images having different exposure conditions in correspondence with a frame rate of the motion picture and generating one composite image from the plurality of captured images, a second dynamic range expansion processing processor that performs the dynamic range expansion process by causing the imaging unit to capture one captured image in correspondence with the frame rate of the motion picture and correcting an output value of a signal of the one captured image, and a control processor that causes the first dynamic range expansion processing processor or the second dynamic range expansion processing processor to execute the dynamic range expansion process based on a time of one frame period of the frame rate and a total exposure time in a case of capturing the plurality of captured images in the first dynamic range expansion processing processor.

While the examples of the present invention are described thus far, the present invention is not limited to the embodiments and can be subjected to various modifications without departing from the spirit of the present invention.

EXPLANATION OF REFERENCES

2: digital camera
3: camera main body
4: lens barrel
5: flash light emission unit
6: shutter button
7: power supply switch
8: display unit
9: operation unit
10: external memory
12: lens unit
20: mechanical shutter
21: imaging element
22: processing unit
23: AD conversion unit
24: main memory
25: system control unit
26: shutter drive unit
27: lens drive unit
28: power supply control unit
29: power supply
30: control memory
31: image processing unit
32: compression and decompression unit
33: storage control unit
35: display control unit
36: user interface
50: imaging unit
51: ND filter
53: ND filter drive unit
100: main control unit
101: smartphone
102: casing
110: wireless communication unit
120: display and input unit
121: display panel
122: operation panel
130: call unit
131: speaker
132: microphone
140: operation unit
141: camera unit
150: storage unit
151: internal storage unit
152: external storage unit
160: external input-output unit
170: GPS reception unit
180: motion sensor unit
190: power supply unit
301: first dynamic range expansion processing unit
303: second dynamic range expansion processing unit
305: control unit
307: ISO sensitivity changing unit

What is claimed is:

1. An imaging apparatus comprising:
an imager that images a motion picture of a subject; and
a processor configured to:
perform a dynamic range expansion process by causing the imager to capture a plurality of captured images having different exposure conditions in correspondence with a frame rate of the motion picture and generating one composite image from the plurality of captured images,
perform a dynamic range expansion process by causing the imager to capture one captured image in correspondence with the frame rate of the motion picture and correcting an output value of a signal of the one captured image, and
execute the dynamic range expansion process by generating one composite image from the plurality of captured images or the dynamic range expansion process by correcting the output value of the signal of the one captured image, based on a time of one frame period of the frame rate and a total exposure time in a case of capturing the plurality of captured images in the dynamic range expansion process by generating one composite image from the plurality of captured images.

2. The imaging apparatus according to claim 1,
wherein the processor configured to change the exposure condition by changing the exposure time.

3. The imaging apparatus according to claim 1,
wherein the processor configured to execute the dynamic range expansion process by generating one composite image from the plurality of captured images or the dynamic range expansion process by correcting the output value of the signal of the one captured image, based on a comparison result between the time of one frame period and the total exposure time in a case of capturing the plurality of captured images in the dynamic range expansion process by generating one composite image from the plurality of captured images.

4. The imaging apparatus according to claim 2,
wherein the processor configured to execute the dynamic range expansion process by generating one composite image from the plurality of captured images or the dynamic range expansion process by correcting the output value of the signal of the one captured image, based on a comparison result between the time of one frame period and the total exposure time in a case of capturing the plurality of captured images in the dynamic range expansion process by generating one composite image from the plurality of captured images.

5. The imaging apparatus according to claim 1,
wherein the processor configured to execute the dynamic range expansion process by generating one composite image from the plurality of captured images in a case where the time of one frame period is longer than or equal to the total exposure time in a case of capturing the plurality of captured images in the dynamic range expansion process by generating one composite image from the plurality of captured images, and
wherein the processor configured to execute the dynamic range expansion process by correcting the output value of the signal of the one captured image in a case where the time of one frame period is shorter than the total exposure time in a case of capturing the plurality of captured images in the dynamic range expansion process by generating one composite image from the plurality of captured images.

6. The imaging apparatus according to claim 1,
wherein the processor configured to cause the imager to capture a first captured image and a second captured image having a shorter exposure time than the first captured image and generate the composite image from the first captured image and the second captured image.

7. The imaging apparatus according to claim 1,
wherein the processor configured to cause the imager to capture a first captured image, a second captured image having a shorter exposure time than the first captured image, and a third captured image having a shorter exposure time than the second captured image and generate the composite image from the first captured image, the second captured image, and the third captured image.

8. The imaging apparatus according to claim 1,
wherein the processor configured to change the exposure condition by changing ISO sensitivity.

9. The imaging apparatus according to claim 8,
wherein the processor configured to change ISO sensitivity of the captured image captured by the imager, and
wherein the processor configured to execute the dynamic range expansion process by generating one composite image from the plurality of captured images or the dynamic range expansion process by correcting the output value of the signal of the one captured image, based on the time of one frame period and the total exposure time in a case of capturing the plurality of captured images in the dynamic range expansion process by generating one composite image from the plurality of captured images, the total exposure time including the exposure time in a case of capturing the plurality of captured images by decreasing the ISO sensitivity.

10. The imaging apparatus according to claim 8,
wherein the processor configured to change ISO sensitivity of the captured image captured by the imager, and
wherein the processor configured to execute the dynamic range expansion process by generating one composite image from the plurality of captured images or the dynamic range expansion process by correcting the output value of the signal of the one captured image, based on a comparison result between the time of one frame period and the total exposure time in a case of capturing the plurality of captured images in the dynamic range expansion process by generating one composite image from the plurality of captured images, the total exposure time including the exposure time in a case of capturing the plurality of captured images by decreasing the ISO sensitivity.

11. The imaging apparatus according to claim 9,
wherein in a case where the time of one frame period is longer than or equal to the total exposure time including the exposure time in a case of capturing the plurality of captured images by decreasing the ISO sensitivity, the processor configured to capture at least one captured image of the plurality of captured images by changing the ISO sensitivity.

12. The imaging apparatus according to claim 1,
wherein an ND filter is disposed in the imager, and
wherein the processor configured to execute the dynamic range expansion process based on the captured image captured by the imager in which the ND filter is disposed.

13. The imaging apparatus according to claim 12,
wherein the ND filter that is insertable and withdrawable is disposed in the imager, and
wherein the processor configured to generate the composite image from the captured image captured by the imager in which the ND filter is disposed, and the captured image captured by the imager in which the ND filter is not disposed.

14. The imaging apparatus according to claim 1,
wherein the processor configured to record a switching point of the dynamic range expansion process between the dynamic range expansion process by generating one composite image from the plurality of captured images and the dynamic range expansion process by correcting the output value of the signal of the one captured image.

15. The imaging apparatus according to claim 14,
wherein the processor configured to record the switching point in a header of a file of the motion picture or a file different from the file of the motion picture.

16. The imaging apparatus according to claim 1,
wherein after an elapse of a predetermined time from first switching of the dynamic range expansion process between the dynamic range expansion process by generating one composite image from the plurality of captured images and the dynamic range expansion process by correcting the output value of the signal of the one captured image, the processor configured to perform second switching of the dynamic range expansion process between the dynamic range expansion process by generating one composite image from the plurality of captured images and the dynamic range expansion process by correcting the output value of the signal of the one captured image.

17. The imaging apparatus according to claim 1, wherein the processor configured to generate the composite image using the plurality of captured images captured in different frames.

18. The imaging apparatus according to claim 1, wherein the processor configured to determine whether or not a shutter speed is changeable and execute the dynamic range expansion process by generating one composite image from the plurality of captured images or the dynamic range expansion process by correcting the output value of the signal of the one captured image in a case where the shutter speed is changeable.

19. An imaging method of the imaging apparatus according to claim 1 including the imager that images the motion picture of the subject, and the processor configured to perform the dynamic range expansion process by causing the imager to capture the plurality of captured images having different exposure conditions in correspondence with the frame rate of the motion picture and generating one composite image from the plurality of captured images, and to perform the dynamic range expansion process by causing the imager to capture one captured image in correspondence with the frame rate of the motion picture and correcting the output value of the signal of the one captured image, the method comprising:
a step of controlling execution of the dynamic range expansion process by generating one composite image from the plurality of captured images or the dynamic range expansion process by correcting the output value of the signal of the one captured image, based on a time of one frame period of the frame rate and the total exposure time in a case of capturing the plurality of captured images in the dynamic range expansion process by generating one composite image from the plurality of captured images.

20. A non-transitory computer readable recording medium storing a program causing a computer to execute an imaging method of the imaging apparatus according to claim 1 including the imager that images the motion picture of the subject, and the processor configured to perform the dynamic range expansion process by causing the imager to capture the plurality of captured images having different exposure conditions in correspondence with the frame rate of the motion picture and generating one composite image from the plurality of captured images, and to perform the dynamic range expansion process by causing the imager to capture one captured image in correspondence with the frame rate of the motion picture and correcting the output value of the signal of the one captured image, the program causing the computer to execute the imaging method including:
a step of controlling execution of the dynamic range expansion process by generating one composite image from the plurality of captured images or the dynamic range expansion process by correcting the output value of the signal of the one captured image, based on the time of one frame period of the frame rate and the total exposure time in a case of capturing the plurality of captured images in the dynamic range expansion process by generating one composite image from the plurality of captured images.

* * * * *